US012812030B2

(12) United States Patent
Seo et al.

(10) Patent No.: US 12,812,030 B2
(45) Date of Patent: Nov. 24, 2026

(54) ELECTRONIC DEVICE COMPRISING ANTENNA MEMBER

(71) Applicant: Samsung Electronics Co., Ltd., Suwon-si (KR)

(72) Inventors: Mincheol Seo, Suwon-si (KR); Gyubok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 18/897,961

(22) Filed: Sep. 26, 2024

(65) Prior Publication Data

US 2025/0023970 A1 Jan. 16, 2025

Related U.S. Application Data

(63) Continuation of application No. PCT/KR2023/003157, filed on Mar. 8, 2023.

(30) Foreign Application Priority Data

Mar. 28, 2022 (KR) ........................ 10-2022-0038391
Apr. 21, 2022 (KR) ........................ 10-2022-0049387

(51) Int. Cl.
*H04M 1/02* (2006.01)
*H01Q 1/24* (2006.01)
*H01Q 1/38* (2006.01)

(52) U.S. Cl.
CPC .......... *H04M 1/0277* (2013.01); *H01Q 1/243* (2013.01); *H01Q 1/38* (2013.01); *H04M 1/0237* (2013.01)

(58) Field of Classification Search
CPC .. H04M 1/026; H04M 1/0237; H04M 1/0277; H04M 1/0239; H04M 1/0268;
(Continued)

(56) References Cited

U.S. PATENT DOCUMENTS 7,616,161 B2 * 11/2009 Nishikido .............. H01Q 5/378 343/702
8,570,756 B2 10/2013 Sakai et al.
(Continued)

FOREIGN PATENT DOCUMENTS

JP H10-308618 A 11/1998
JP 2007-104493 A 4/2007
(Continued)

OTHER PUBLICATIONS

International Search Report with Written Opinion and English translation dated Jun. 9, 2023; International Appln. No. PCT/KR2023/003157.

(Continued)

*Primary Examiner* — Allen L Parker
*Assistant Examiner* — Peter Krim
(74) *Attorney, Agent, or Firm* — Jefferson IP Law, LLP

(57) ABSTRACT

An electronic device is provided. The electronic device includes a first housing, a second housing slidably coupled to the first housing, a first printed circuit board disposed in the first housing and having a communication module disposed thereon, a second printed circuit board disposed in the second housing, a connection member made of a flexible material to electrically connect the first printed circuit board and the second printed circuit board, a support structure fixed to the connection member and made of a non-conductive material, and an antenna member surrounding at least a portion of the support structure and made of a conductive material to be electrically connected to the connection member, the antenna member being configured to transmit or receive a radio frequency (RF) signal.

18 Claims, 22 Drawing Sheets

(58) Field of Classification Search
CPC ..... H01Q 1/243; G06F 1/1652; G06F 1/1624; H05K 5/0217; H05K 5/0086; H05K 5/1427
See application file for complete search history.

(56) References Cited

U.S. PATENT DOCUMENTS

| | | | |
|---|---|---|---|
| 10,203,725 B2 | 2/2019 | Song et al. | |
| 10,904,371 B1 | 1/2021 | Song et al. | |
| 11,243,575 B1 | 2/2022 | Kang et al. | |
| 11,493,956 B2 | 11/2022 | Kang et al. | |
| 2009/0176541 A1* | 7/2009 | Okajima | H01Q 9/0407 455/575.3 |
| 2010/0307787 A1 | 12/2010 | Ohmori et al. | |
| 2012/0194395 A1* | 8/2012 | Williams | H01Q 1/32 343/890 |
| 2012/0299787 A1 | 11/2012 | Sakurai et al. | |
| 2016/0164168 A1* | 6/2016 | Choi | H01Q 9/26 343/702 |
| 2019/0268455 A1* | 8/2019 | Baek | G06F 1/1624 |
| 2020/0371558 A1* | 11/2020 | Kim | H04M 1/0237 |
| 2021/0075121 A1 | 3/2021 | Li et al. | |
| 2021/0326569 A1 | 10/2021 | Song et al. | |
| 2021/0336356 A1 | 10/2021 | Choi et al. | |
| 2021/0337054 A1 | 10/2021 | Choi et al. | |
| 2022/0019260 A1 | 1/2022 | Kang et al. | |
| 2022/0019261 A1 | 1/2022 | Kang et al. | |
| 2023/0155610 A1 | 5/2023 | Lee et al. | |
| 2023/0156116 A1 | 5/2023 | Yoon et al. | |

FOREIGN PATENT DOCUMENTS

| | | | |
|---|---|---|---|
| JP | 4340301 | B2 | 10/2009 |
| JP | 2020-140007 | A | 9/2020 |
| KR | 10-2019-0086305 | A | 7/2019 |
| KR | 10-2019-0101605 | A | 9/2019 |
| KR | 10-2021-0017066 | A | 2/2021 |
| KR | 10-2022-0008716 | A | 1/2022 |
| KR | 10-2022-0008724 | A | 1/2022 |
| KR | 10-2022-0014806 | A | 2/2022 |
| WO | 2021/246730 | A1 | 12/2021 |

OTHER PUBLICATIONS

Extended European Search Report dated May 28, 2025; European Appln. No. 23781187.2-1201 / 4485693 PCT/KR2023003157.
Korean Office Action dated Jul. 14, 2026, issued in Korean Patent Application No. 10-2022-0049387.

* cited by examiner

ELECTRONIC DEVICE COMPRISING ANTENNA MEMBER

CROSS-REFERENCE TO RELATED APPLICATION(S)

This application is a continuation application, claiming priority under § 365(c), of an International application No. PCT/KR2023/003157, filed on Mar. 8, 2023, which is based on and claims the benefit of a Korean patent application number 10-2022-0038391, filed on Mar. 28, 2022, in the Korean Intellectual Property Office, and of a Korean patent application number 10-2022-0049387, filed on Apr. 21, 2022, in the Korean Intellectual Property Office, the disclosure of each of which is incorporated by reference herein in its entirety.

BACKGROUND

1. Field

The disclosure relates to an electronic device including an antenna member.

2. Description of Related Art

As transformable displays have been developed, various types of electronic devices beyond existing bar-type electronic devices are emerging.

A rollable electronic device may refer to an electronic device that includes a slidable housing and a display with a display area that expands or contracts depending on the sliding of the housing.

The above information is presented as background information only to assist with an understanding of the disclosure. No determination has been made, and no assertion is made, as to whether any of the above might be applicable as prior art with regard to the disclosure.

SUMMARY

Rollable electronic devices have a limited space for electronic components due to the nature of the electronic devices where a portion of a display has to be accommodated therein. More particularly, as the number of antennas inevitably increases with the development of communication services, securing space for antenna placement is necessary.

Aspects of the disclosure are to address at least the above-mentioned problems and/or disadvantages and to provide at least the advantages described below. Accordingly, an aspect of the disclosure is to provide an electronic device including an antenna member for securing space for antenna placement.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing slidably coupled to the first housing, a first printed circuit board disposed in the first housing and having a communication module disposed thereon, a second printed circuit board disposed in the second housing, a connection member made of a flexible material to electrically connect the first printed circuit board and the second printed circuit board, a support structure fixed to the connection member and made of a non-conductive material, and an antenna member surrounding at least a portion of the support structure and made of a conductive material to be electrically connected to the connection member, the antenna member being configured to transmit or receive a radio frequency (RF) signal.

In accordance with another aspect of the disclosure, an electronic device is provided. The electronic device includes a first housing, a second housing slidably coupled to the first housing, a first printed circuit board disposed in the first housing and having a communication module disposed thereon, a second printed circuit board disposed in the second housing, a connection member made of a flexible material to electrically connect the first printed circuit board and the second printed circuit board, and an antenna member made of a conductive material to be electrically connected to the connection member and configured to transmit or receive an RF signal.

In various embodiments disclosed herein, an antenna is disposed on a connection member that electrically connects multiple electrical objects. Therefore, an antenna is disposed inside the electronic device without forming a separate space for the antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
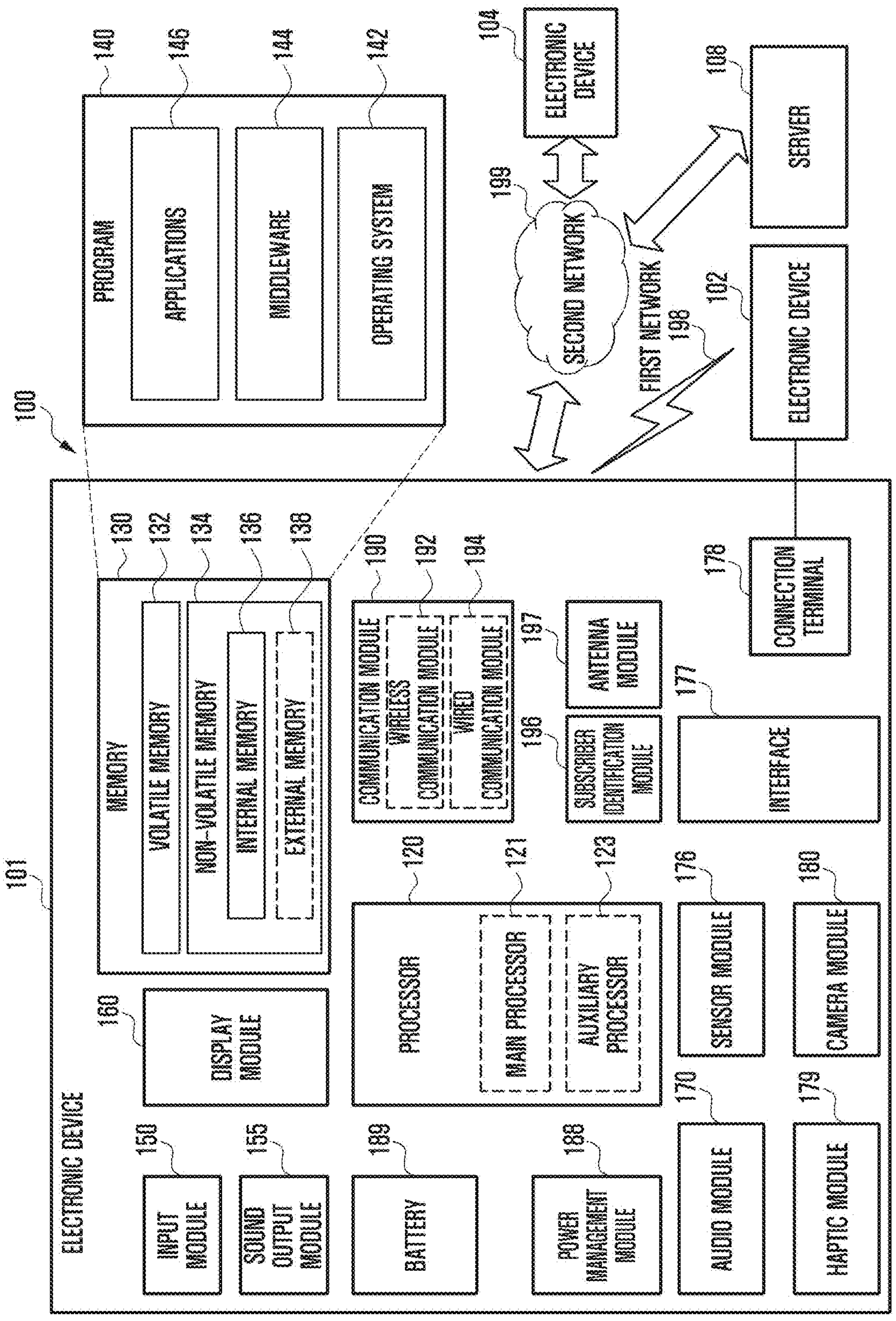
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that a singular forms "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134. The non-volatile memory 134 may include internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the external electronic device 101. According to an embodiment of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
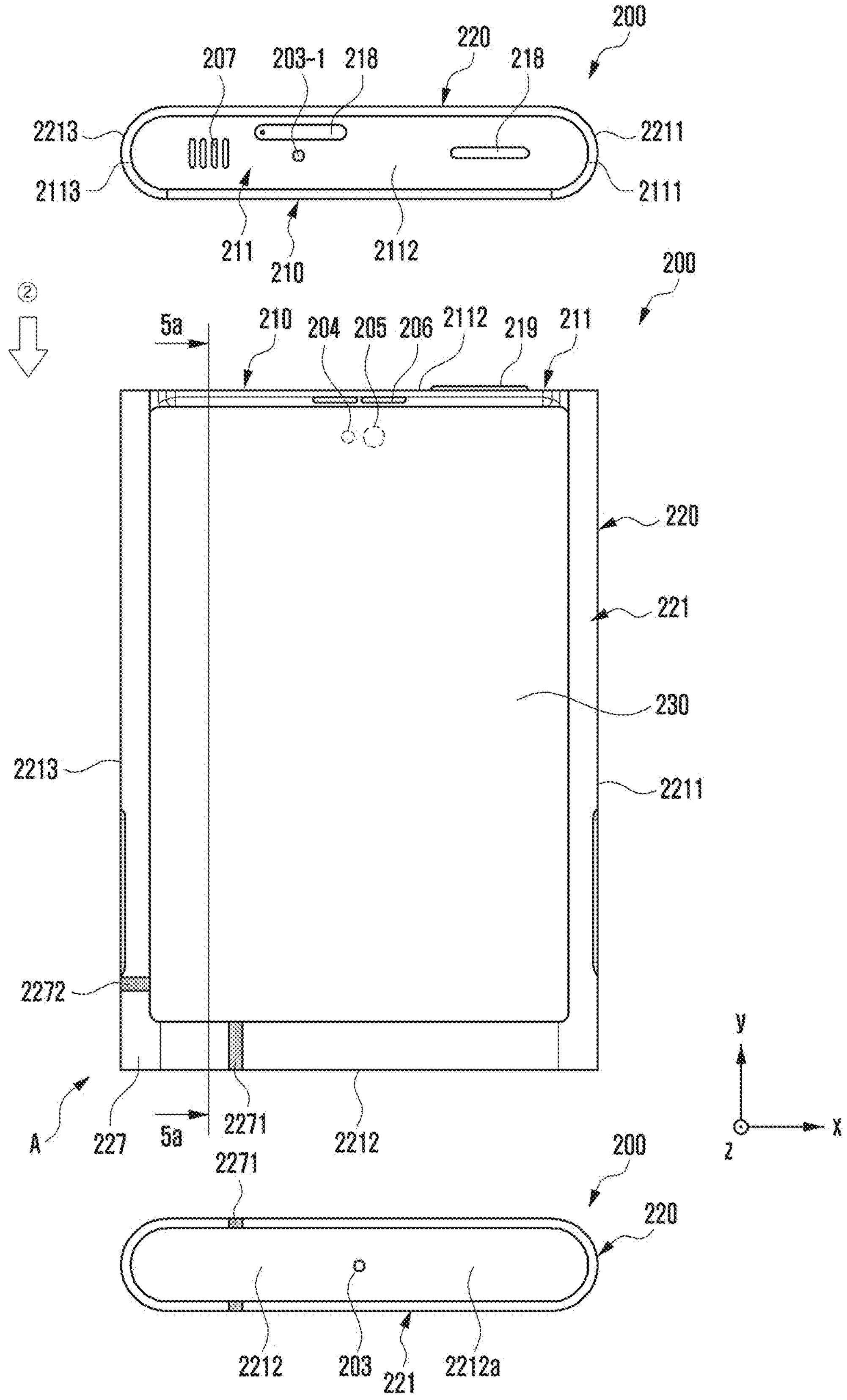
FIGS. 2A and 2B illustrate front and rear views of an electronic device in a slide-in state according to various embodiments of the disclosure.
Figure 2B:
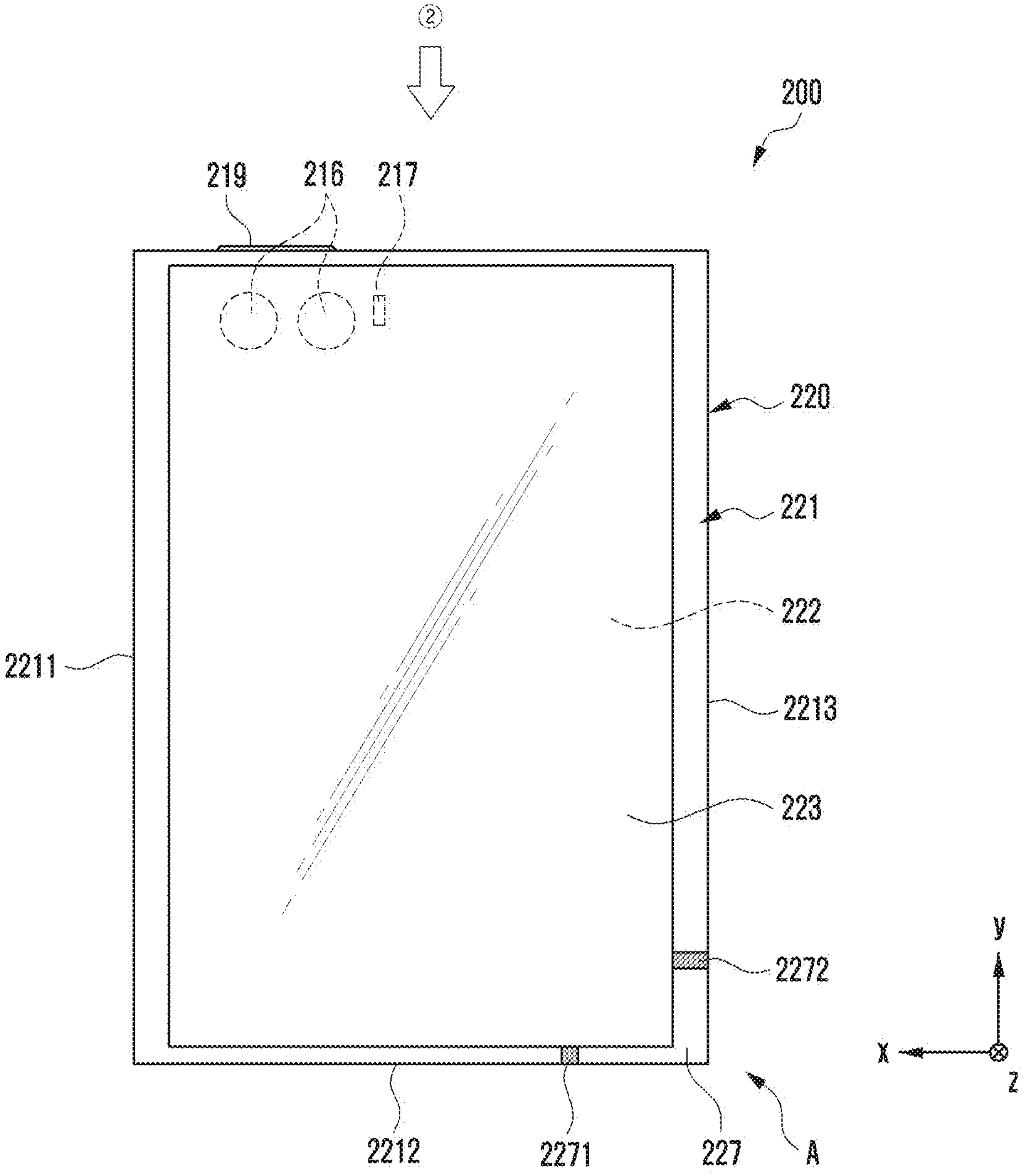
Figure 3A:
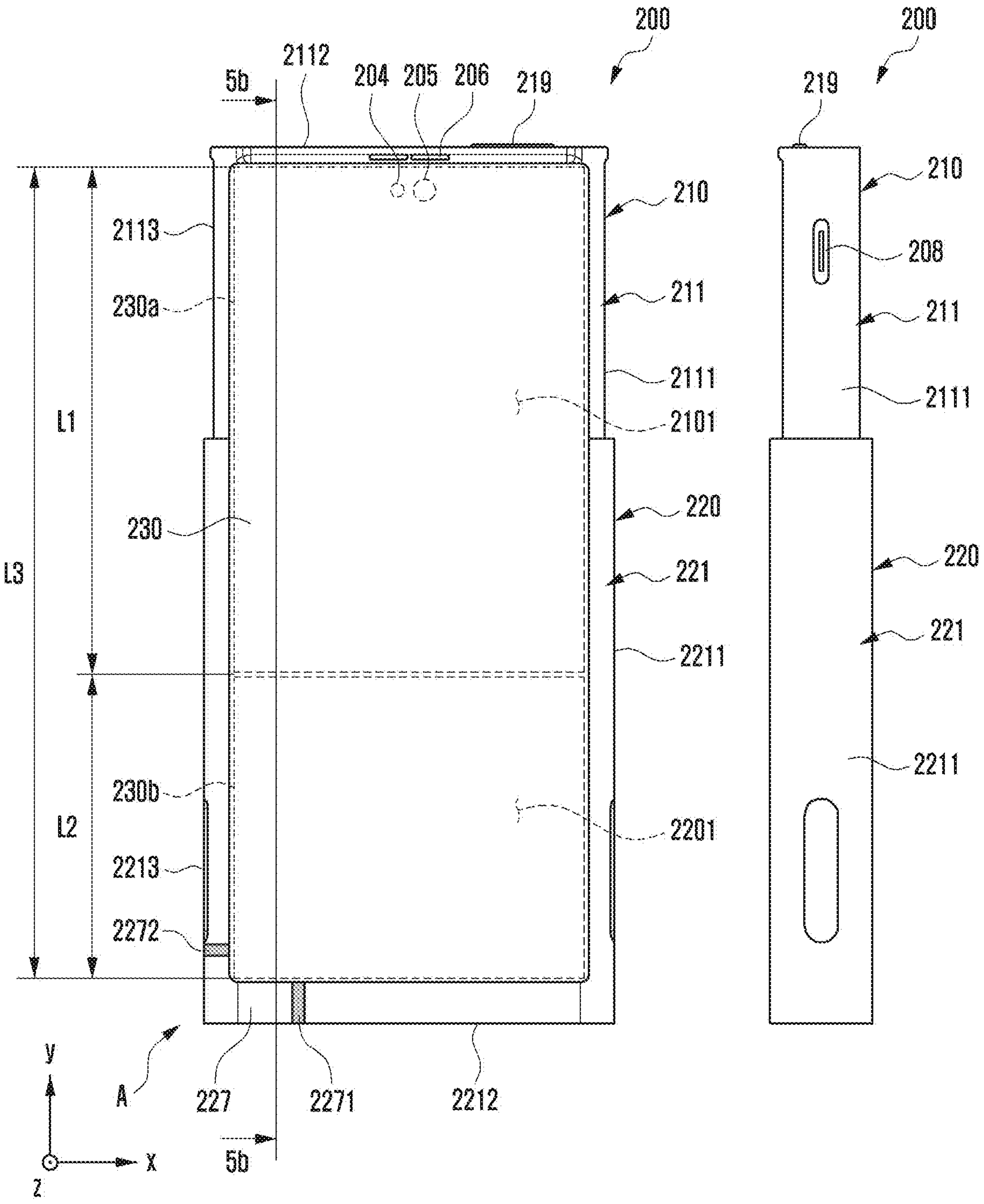
FIGS. 3A and 3B illustrate front and rear views of an electronic device in a slide-out state according to various embodiments of the disclosure.
Figure 3B:
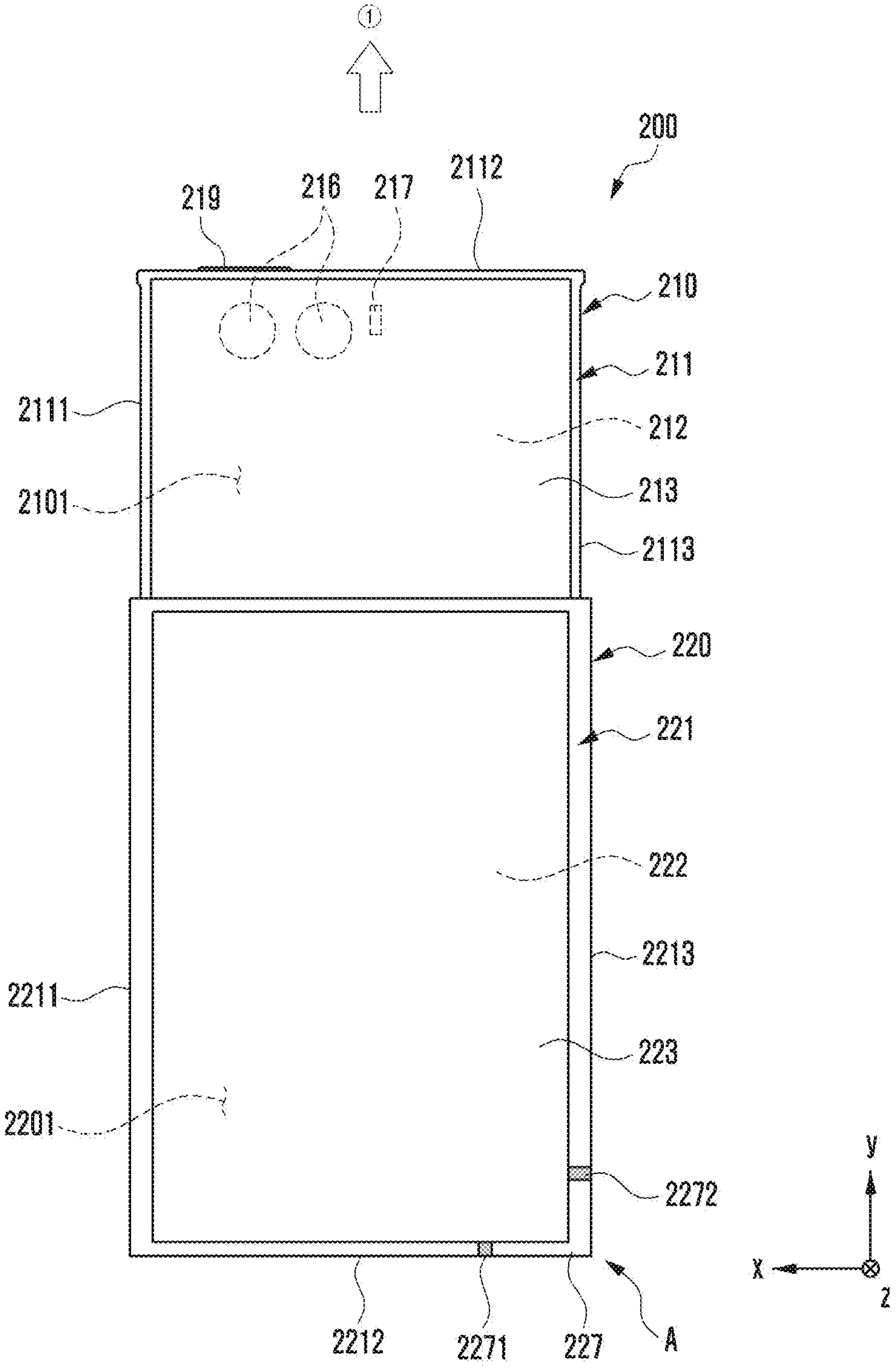

FIGS. 2A and 2B illustrate front and rear views of an electronic device in a slide-in state according to various embodiments of the disclosure. FIGS. 3A and 3B illustrate front and rear views of an electronic device in a slide-out state according to various embodiments of the disclosure.

The electronic device 200 of FIGS. 2A, 2B, 3A, and 3B may be at least partially similar to the electronic device 101 of FIG. 1 or may further include other embodiments of the electronic device.

Referring to FIGS. 2A, 2B, 3A, and 3B, the electronic device 200 may include a first housing 210 (e.g., a first housing structure, a moving part, or a slide housing), a second housing 220 (e.g., a second housing structure, a fixing part, or a base housing) coupled to be slidable in a predetermined direction (e.g., in direction ① or direction ②) (e.g., ±y-axis direction) from the first housing 210, and a flexible display 230 (e.g., an expandable display, or a stretchable display) disposed to be supported by at least a portion of the first and second housings 210 and 220. According to an embodiment of the disclosure, the electronic device 200 may be configured such that, with respect to the second housing 220 held by a user, the first housing 210 is slid out in a first direction (direction ①) or slid in in a second direction (direction ②) opposite to the first direction (direction ①). According to an embodiment of the disclosure, at least a portion of the first housing 210 including a first space 2101 may be switched into the slide-in state by being accommodated in a second space 2201 of the second housing 220. According to an embodiment of the disclosure, the electronic device 200 may include a bendable member or a bendable support member (e.g., the bendable support member 240 of FIG. 4) (e.g., a multi-joint hinge module or a multi-bar assembly) that forms at least partially the same plane as at least a portion of the first housing 210 in the slide-out state and is at least partially accommodated into the second space 2201 of the second housing 220 in the slide-in state. According to an embodiment of the disclosure, at least a portion of the flexible display 230 may be accommodated into the inner space 2201 of the second housing 220 while being supported by the bendable support member (e.g., the bendable support member 240 in FIG. 4) in the slide-out state, thereby being disposed to be invisible from the outside. According to an embodiment of the disclosure, in the slide-out state, at least a portion of the flexible display 230 may be disposed to be visible from the outside while being supported by the bendable support member (e.g., the bendable support member 240 in FIG. 4) which at least partially forms the same plane as the first housing 210. The flexible display 230 may increase or decrease the portion that is visible to the outside (e.g., the display area (e.g., the display area 230-1 in FIGS. 5A and 5B) depending on the sliding of the first housing 210 relative to the second housing 220. In addition, the portion that is accommodated inside the electronic device 200 (e.g., the accommodated area (e.g., the accommodated area 230-2 in FIG. 5A) can increase or decrease depending on the sliding of the first housing 210 relative to the second housing 220.

According to various embodiments of the disclosure, the electronic device 200 may include a first housing 210 including a first side surface member 211 and a second housing 220 including a second side surface member 221. According to an embodiment of the disclosure, the first side surface member 211 may include a first side surface 2111 extending along a first direction (e.g., the y-axis direction), a second side surface 2112 extending from the first side surface 2111 along a direction substantially perpendicular to the first side surface 2111 (e.g., the x-axis direction) to have a length smaller than that of the first side surface 2111, and a third side surface 2113 extending from the second side surface 2112 to be substantially parallel to the first side surface 2111. According to an embodiment of the disclosure, at least a portion of the first side surface member 211 may be made of a conductive material (e.g., metal). In some embodiments of the disclosure, the first side surface member 211 may be formed by coupling a conductive material and a non-conductive material (e.g., polymer). According to an embodiment of the disclosure, the first housing 210 may include a first support member 212 extending from at least a portion of the first side surface member 211 to at least a portion of the first space 2101. According to an embodiment of the disclosure, the first support member 212 may be integrated with the first side surface member 211. In some embodiments of the disclosure, the first support member 212 may be provided separately from the first side surface member 211 and structurally coupled to the first side surface member 211.

According to various embodiments of the disclosure, the second side surface member 221 may include a fourth side surface 2211 that at least partially corresponds to the first side surface 2111, a fifth side surface 2212 that extends from the fourth side surface 2211 in a direction substantially parallel to the second side surface 2112 and is shorter than the fourth side surface 2211, and a sixth side surface 2213 that extends from the fifth side surface 2212 to correspond to the third side surface 2113. According to an embodiment of the disclosure, at least a portion of the second side surface member 221 may be made of a conductive member (e.g., metal). In some embodiments of the disclosure, the second side surface member 221 may be formed by coupling a conductive member and a non-conductive member (e.g., polymer). According to an embodiment of the disclosure, at least a portion of the second side surface member 221 may include a second support member 222 extending to at least a portion of the second space 2201 of the second housing 220. According to an embodiment of the disclosure, the second support member 222 may be integrated with the second side surface member 221. In some embodiments of the disclosure, the second support member 222 may be provided separately from the second side surface member 221 and structurally coupled to the second side surface member 221.

According to various embodiments of the disclosure, the first side surface 2111 and the fourth side surface 2211 may be slidably coupled to each other. According to an embodiment of the disclosure, the third side surface 2113 and the sixth side surface 2213 may be slidably coupled to each other. According to an embodiment of the disclosure, in the slide-in state, the first side surface 2111 may be disposed to be substantially invisible from the outside by overlapping the fourth side surface 2211. According to an embodiment of the disclosure, in the slide-in state, the third side surface 2113 may be disposed to be substantially invisible from the outside by overlapping the sixth side surface 2213. In some embodiments of the disclosure, in the slide-in state, the first and third side surfaces 2111 and 2113 may be disposed to be at least partially visible from the outside. According to an embodiment of the disclosure, in the slide-in state, the first support member 212 may be disposed to be substantially invisible from the outside by overlapping the second support member 222. In some embodiments of the disclosure, in the slide-in state, a portion of the first support member 212 may be disposed to be invisible from the outside by overlapping the second support member 222, and the remaining portion of the first support member 212 may be disposed to be visible from the outside.

According to various embodiments of the disclosure, the electronic device 200 may include a first rear surface cover 213 coupled to the first housing 210 on the rear surface thereof. According to an embodiment of the disclosure, the first rear surface cover 213 may be disposed through at least a portion of the first support member 212. In some embodiments of the disclosure, the first rear surface cover 213 may be integrated with the first side surface member 211. According to an embodiment of the disclosure, the first rear surface cover 213 may be made of polymer, coated or tinted glass, ceramic, metal (e.g., aluminum, stainless steel (STS), or magnesium), or a combination of at least two of these materials. In some embodiments of the disclosure, the first rear surface cover 213 may extend to at least a portion of the first side surface member 211. In some embodiments of the disclosure, at least a portion of the first support member 212 may be replaced with the first rear surface cover 213.

According to an embodiment of the disclosure, the electronic device 200 may include a second rear surface cover 223 coupled to the second housing 220 on the rear surface thereof. According to an embodiment of the disclosure, the second rear surface cover 223 may be disposed through at least a portion of the second support member 222. In some embodiments of the disclosure, the second rear surface cover 223 may be integrated with the second side surface member 221. According to an embodiment of the disclosure, the second rear surface cover 223 may be made of polymer, coated or tinted glass, ceramic, metal (e.g., aluminum, stainless steel (STS), or magnesium), or a combination of at least two of these materials. In some embodiments of the disclosure, the second rear surface cover 223 may extend to at least a portion of the second side surface member 221. In some embodiments of the disclosure, at least a portion of the second support member 222 may be replaced with the second rear surface cover 223.

According to various embodiments of the disclosure, the electronic device 200 may include a flexible display 230 disposed to be supported by at least a portion of the first housing 210 and the second housing 220. According to an embodiment of the disclosure, the flexible display 230 may include a first portion 230*a* (e.g., a flat portion) that is always visible from the outside, and a second portion 230*b* (e.g., a bendable portion) extending from the first portion 230*a* and at least partially accommodated into the second space 2201 of the second housing 220 to be at least partially invisible from the outside in the slide-in state. According to an embodiment of the disclosure, the first portion 230*a* may be disposed to be supported by the first housing 210, and the second portion 230*b* may be disposed to be at least partially supported by the bendable support member (e.g., the bendable support member 240 in FIG. 4). According to an embodiment of the disclosure, in the state in which the first housing 210 is slid out along the first direction (direction (I), the second portion 230*b* of the flexible display 230 may extend from the first portion 230*a* while being supported by the bendable support member (e.g., the bendable support member 240 in FIG. 4), and may be disposed to form substantially the same plane as the first portion 230*a* and to be visible from the outside. According to an embodiment of the disclosure, in the state in which the second housing 220 is slid in along the second direction (direction ②), the second portion 230*b* of the flexible display 230 may be disposed to be accommodated into the second space 2201 of the second housing 220 and to be invisible from the outside. Accordingly, in the electronic device 200, the display area of the flexible display 230 may be induced to be variable as the first housing 210 is moved in a sliding manner from the second housing 220 along a predetermined direction (e.g., the ±y-axis direction).

According to various embodiments of the disclosure, the flexible display 230 may be variable in length in the first direction (direction ①) depending on the sliding of the first housing 210 that is moved with respect to the second housing 220. For example, in the slide-in state, the flexible display 230 may have a first display area corresponding to the first length L1 (e.g., an area corresponding to the first portion 230*a*). According to an embodiment of the disclosure, in the slide-out state, depending on the sliding of the first housing 210 further moved by a second length L2 with respect to the second housing 220, the flexible display 230 may expand to have a third display area (e.g., an area including the first portion 230*a* and the second portion 230*b*), which corresponds to a third length L3 longer than the first length L1 and is larger than the first display area.

According to various embodiments of the disclosure, the electronic device 200 may include at least one of an input device (e.g., a microphone 203-1) disposed in the first space 2101 of the first housing 210, a sound output device (e.g., a call receiver 206 or a speaker 207), sensor modules 204 and 217, a camera module (e.g., the first camera module 205 or the second camera module 216), a connector port 208, a key input device 219, or an indicator (not illustrated). According to an embodiment of the disclosure, the electronic device 200 may include another input device (e.g., the microphone 203) disposed in the second housing 220. As another embodiment of the disclosure, the electronic device 200 may be configured such that at least one of the above-mentioned components is omitted or other components are additionally included. As another embodiment of the disclosure, at least one of the above-described components may be disposed in the second space 2201 of the second housing 220.

According to various embodiments of the disclosure, the input device may include a microphone 203-1. In some embodiments of the disclosure, the input device (e.g., the microphone 203-1) may include multiple microphones arranged to detect the direction of sound. The sound output device may include, for example, a call receiver 206 and a speaker 207. According to an embodiment of the disclosure, regardless of the slide-in/slide-out state, the speaker 207 may face the outside through at least one speaker hole provided in the first housing 210 at a position always exposed to the outside (e.g., in the second side surface 2112). According to an embodiment of the disclosure, in the slide-out state, the connector port 208 may face the outside through a connector port hole disposed in the first housing 210. In some embodiments of the disclosure, in the slide-in state, the connector port 208 may face the outside through an opening provided in the second housing 220 to correspond to the connector port hole. In some embodiments of the disclosure, the call receiver 206 may include a speaker that operates without a separate speaker hole (e.g., a piezo speaker).

According to various embodiments of the disclosure, the sensor modules 204 and 217 may generate electrical signals or data values corresponding to an internal operating state or an external environmental state of the electronic device 200. The sensor modules 204 and 217 may include, for example, a first sensor module 204 (e.g., a proximity sensor or an illuminance sensor) disposed on the front surface of the electronic device 200 and/or a second sensor module 217 (e.g., a heart rate monitoring (HRM) sensor) disposed on the rear surface of the electronic device 200. According to an embodiment of the disclosure, the first sensor module 204 may be disposed under the flexible display 230 on the front surface of the electronic device 200. According to an embodiment of the disclosure, the first sensor module 204 and/or the second sensor module 217 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments of the disclosure, the camera module may include a first camera module 205 disposed on the front surface of the electronic device 200 and a second camera module 216 disposed on the rear surface of the electronic device 200. According to an embodiment of the disclosure, the electronic device 200 may include a flash (not illustrated) located near the second camera module 216. According to an embodiment of the disclosure, the camera modules 205 and 216 may each include one or more lenses, an image sensor, and/or an image signal processor. In an embodiment of the disclosure, the first camera module 205 may be disposed under the flexible display 230 and may be configured to photograph a subject through a portion of an active area (e.g., a display area) of the flexible display 230.

According to various embodiments of the disclosure, the first camera module 205 among the camera modules and some sensor modules 204 among the sensor modules 204 and 217 may be disposed to detect the external environment through the flexible display 230. For example, the first camera module 205 or some sensor modules 204 may be disposed in the first space 2101 of the first housing 210 to come into contact with the external environment through a transmission area or a perforated opening provided in the flexible display 230. According to an embodiment of the disclosure, the area of the flexible display 230, which faces the first camera module 205, may be formed as a transmission area having a predetermined transmittance as a portion of the display area for displaying contents. According to an embodiment of the disclosure, the transmission area may have a transmittance ranging from about 5% to about 20%. The transmission area may include an area overlapping an effective area (e.g., a field of view area) of the first camera module 205 through which light imaged by an image sensor to generate an image passes. For example, the transmission area of the flexible display 230 may include an area having a lower pixel density and/or a lower wire density than the surrounding area. For example, the transmission area may replace the above-mentioned opening. For example, the camera module 205 may include an under-display camera (UDC). In some embodiments of the disclosure, some sensor modules 204 may be disposed to execute their functions in the inner space of the electronic device 200 without being visually exposed through the flexible display 230.

According to various embodiments of the disclosure, the electronic device 200 may include at least one antenna electrically connected to a wireless communication circuit (e.g., the wireless communication module 192 in FIG. 1) disposed in the second housing 220. According to an embodiment of the disclosure, the electronic device 200 may include a bezel antenna A disposed through the conductive second side surface member 221 of the second housing 220. For example, the bezel antenna A may include a conductive portion 227 disposed in at least a portion of the fifth and sixth side surfaces 2212 and 2213 of the second side surface member 221 and electrically split by one or more split portions 2271 and 2272 made of a non-conductive material (e.g., polymer). According to an embodiment of the disclosure, the wireless communication circuit (e.g., the wireless communication module 192 in FIG. 1) may be configured to transmit or receive a wireless signal in at least one predetermined frequency band (e.g., about 800 MHz to 6,000 MHz) (e.g., a legacy band) via the conductive portion 227. According to an embodiment of the disclosure, the electronic device 200 may include a side surface cover **2212*a* disposed on the fifth side surface 2212 to cover at least a portion of at least one split portion 2271. In some embodiments of the disclosure, the bezel antenna A may be disposed on at least one of the second side surface 2112, the fourth side surface 2211, the fifth side surface 2212, or the sixth side surface 2213. In some embodiments of the disclosure, the electronic device 200 may further include at least one antenna module (e.g., a 5G antenna module or an antenna structure) disposed in the inner space (e.g., the first space 2101 or the second space 2201) and configured to transmit or receive a wireless signal of a frequency band ranging from about 3 GHz to 100 GHz via another wireless communication circuit (e.g., the wireless communication module 192 in FIG. 1**).

According to various embodiments of the disclosure, the slide-in/slide-out operation of the electronic device 200 may be automatically performed. For example, the slide-in/slide-out operation of the electronic device 200 may be executed through a gearing operation between a drive motor (e.g., the drive motor 260 in FIG. 4) including a pinion gear (e.g., the pinion gear 261 in FIG. 4) disposed in the first space 2101 in the first housing 210 and a rack gear (e.g., the rack gear 2251 in FIG. 4) disposed in the second space 2201 in the second housing 220 and meshing with the pinion gear 261. For example, when a triggering operation of switching from the slide-in state to the slide-out state or from the slide-out state to the slide-in state is detected, the processor (e.g., the processor 120 in FIG. 1) of the electronic device 200 may operate the drive motor (e.g., the drive motor 260 in FIG. 4) disposed inside the electronic device 200. According to an embodiment of the disclosure, the triggering operation may include selecting (e.g., touching) an object displayed on the flexible display 230 or operating a physical button (e.g., a key button) included in the electronic device 200.

An electronic device 200 according to various embodiments of the disclosure has a design structure in which the drive motor (e.g., the drive motor 260 in FIG. 4) is disposed at an end in the slide-in direction (direction ②) (e.g., the lower end of the first housing 210 in the slide-in state) in the first space 2101 of the first housing 210, and the pinion gear of the drive motor 260 moves along the rack gear (e.g., the rack gear 2251 in FIG. 4) correspondingly disposed in the second space 2201 of the second housing 220 (e.g., the structure in which the drive motor 260 is disposed at the lower end of the first housing 210 in the slide-in state), thereby providing an increased sliding distance (stroke). In addition, the electronic device 200 may provide an efficient electrical connection structure with the drive motor 260 by including electronic components (e.g., a board or a battery) disposed together with the drive motor 260 in the first space 2101 of the first housing 210. In addition, in the slide-out state, the electronic device 200 may contribute to improving the operational reliability by including a support structure disposed in the second space 2201 of the second housing 220 to support at least a portion of the flexible display 230.

Figure 4:
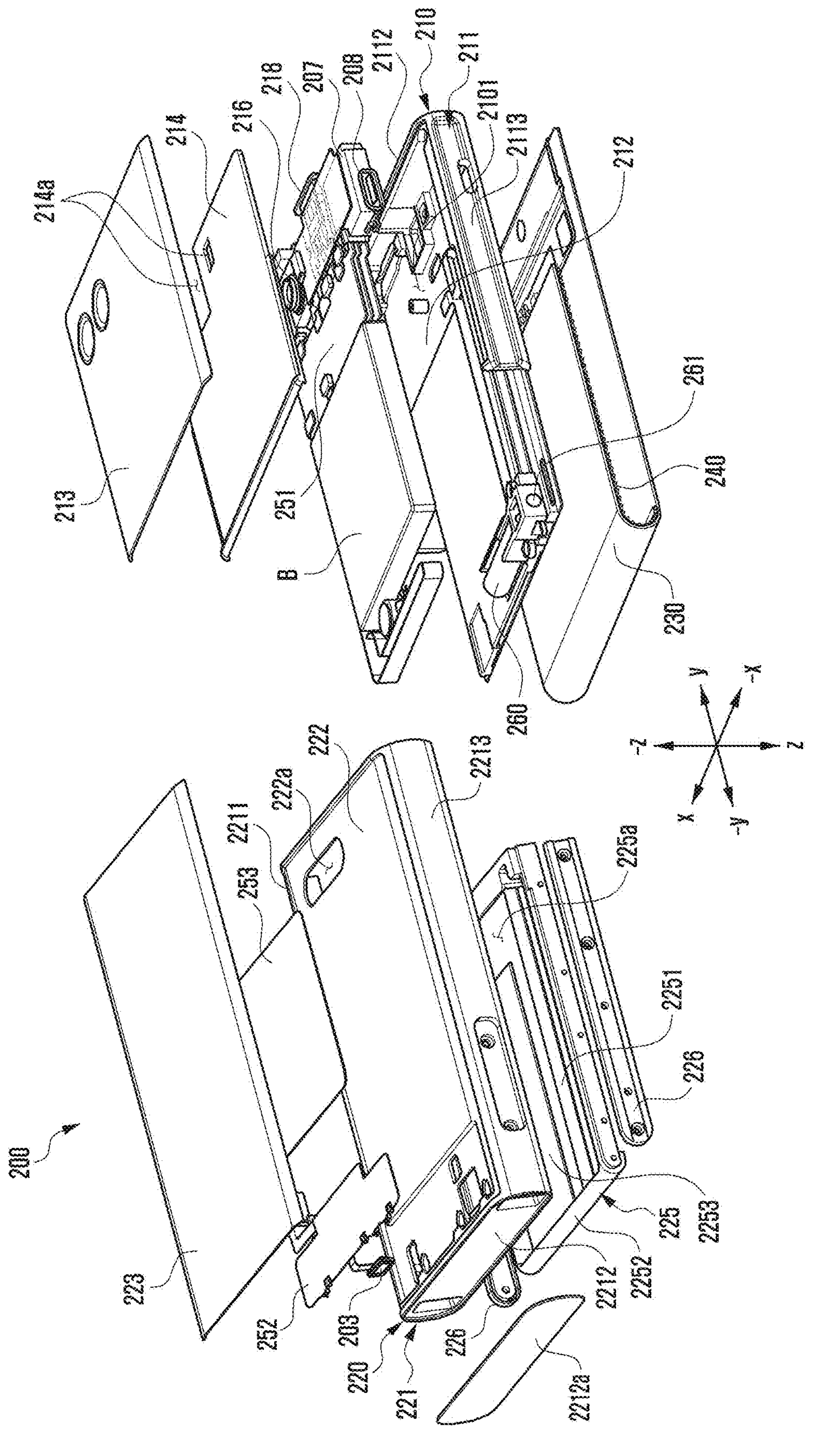
FIG. 4 is an exploded perspective view of an electronic device according to an embodiment according to an embodiment of the disclosure.

FIG. 4 is an exploded perspective view of an electronic device according to an embodiment of the disclosure.

Referring to FIG. 4, in describing the electronic device 200, components that are substantially the same as those of the electronic device 200 of FIGS. 2A, 2B, 3A, and 3B may be assigned with the same reference numerals, and a detailed description thereof may be omitted.

Referring to FIG. 4, the electronic device 200 may include a first housing 210 including a first space 2101, a second housing 220 slidably coupled to the first housing 210 and including a second space (e.g., the second space 2201 of FIG. 3A), a bendable support member 240 at least partially rotatably disposed in the second space 2201, a flexible display 230 disposed to be supported by at least a portion of the bendable support member 240 and the first housing 210, and a moving part configured to drive the first housing 210 in a direction in which the first housing is to be slid into the second housing 220 (e.g., in the −y-axis direction) and/or in a direction in which the first housing 210 is to be slid out from the second housing 220 (e.g., in the y-axis direction). According to an embodiment of the disclosure, the moving part may include a drive motor 260 disposed in the first space 2101 and including a pinion gear, and a rack gear 2251 disposed in the second space 2201 to mesh with the pinion gear 261. According to an embodiment of the disclosure, the moving part may further include a reduction module configured to reduce the rotational speed and increase the driving force by being engaged with the drive motor 260. According to an embodiment of the disclosure, the drive motor 260 may be disposed to be supported via at least a portion of a first support member 212 in the first space 2101 of the first housing 210. According to an embodiment of the disclosure, the drive motor 260 may be fixed to an end (e.g., an edge) of the first support member 212 in the slide-in direction (e.g., the −y-axis direction) in the first space 2101.

According to various embodiments of the disclosure, the electronic device 200 may include multiple electronic components disposed in the first space 2101. According to an embodiment of the disclosure, the multiple electronic components may include a first board 251 (e.g., a main board), and a camera module 216, a socket module 218 (e.g., a SIM tray), a speaker 207, a connector port 208, and a battery B which are arranged around the first board 251. According to one embodiment of the disclosure, the multiple electronic components may be arranged around the first board 251 in the first space 2101 of the first housing 210 together with the drive motor 260, which enables efficient electrical connection.

According to various embodiments of the disclosure, the electronic device 200 may include a rear bracket 214 disposed to cover at least some of multiple electronic components between the first support member 212 and the first rear surface cover 213 in the first housing 210. According to an embodiment of the disclosure, the rear bracket 214 may be structurally coupled to at least a portion of the first support member 212. In some embodiments of the disclosure, the rear bracket 214 may be omitted. According to an embodiment of the disclosure, the rear bracket 214 may be disposed to cover the multiple electronic components and to support the first rear surface cover 213. According to an embodiment of the disclosure, the rear bracket 214 may include a notch area **214*a* or an opening 214*a* (e.g., a through hole) provided in an area corresponding to the camera module 216 and/or the sensor module (e.g., the sensor module 217 in FIG. 3B). According to an embodiment of the disclosure, the camera module 216 and/or the sensor module 217 may be arranged to detect an external environment through the notch area 214*a* or the opening 214*a*. According to an embodiment of the disclosure, the first rear surface cover 213 may be processed to be transparent in an area corresponding to at least the camera module 216 and/or the sensor module 217. In some embodiments of the disclosure, the camera module 216 and/or the sensor module 217 may be configured to operate only when the electronic device 200** is in the slide-out state.

According to various embodiments of the disclosure, the electronic device 200 may include a plate-type support bracket 225 (e.g., a display support bar (DSB)) disposed in the second space 2201 of the second housing 220 and slidably coupled with at least a portion of the first support member 212. According to an embodiment of the disclosure, the support bracket 225 may include an opening **225*a* with a predetermined size. According to an embodiment of the disclosure, the support bracket 225 may include a support member 2252 disposed at one end and having an outer surface bent in a curved shape to support the rear surface of the bendable support member 240, which is bent during the sliding operation. According to an embodiment of the disclosure, the support bracket 225 may include a support plate 2253 configured to support the rear surface of the bendable support member 240 in the slide-out state by extending from at least a portion of the support member 2252 to at least a portion of the opening 225*a*. According to an embodiment of the disclosure, the support bracket 225 may include a rack gear 2251 fixed across the opening 225*a* and having a length in a direction parallel to the sliding direction. In some embodiments of the disclosure, the rack gear 2251 may be integrated with the support bracket 225. According to an embodiment of the disclosure, the electronic device 200 may include a pair of guide rails 226 disposed on opposite side surfaces of the support bracket 225 to guide the opposite ends of the bendable support member 240** in the sliding direction.

In various embodiments of the disclosure, the bendable support member 240 may include a bendable structure to support the flexible display 230 that is bent during the sliding process of the electronic device 200. For example, the bendable support member 240 may include multiple bar-shaped support members that are segmented from each other. The support members included in the bendable support member 240 may have opposite ends inserted into the pair of guide rails 226. The support members are able to support the flexible display 230 that moves during the sliding process while moving along the guide rails 226. The support members, which are segmented from each other, are able to support the bending area of the flexible display 230 (e.g., the bending area 230-3 in FIGS. 5A and 5B).

According to various embodiments of the disclosure, the second housing 220 may include, in the second support member 222, an opening 222*a* (e.g., a through hole) disposed in an area corresponding to the camera module 216 and/or the sensor module 217 disposed in the first housing 210 when the electronic device 200 is in the slide-in state. According to an embodiment of the disclosure, when the electronic device 200 is in the slide-in state, the camera module 216 and/or the sensor module 217 may detect an external environment through the opening 222*a* provided in the second housing 220. In this case, an area of the second rear surface cover 223 corresponding to at least the camera module 216 and/or the sensor module 217 may be processed to be transparent.

Figure 5A:
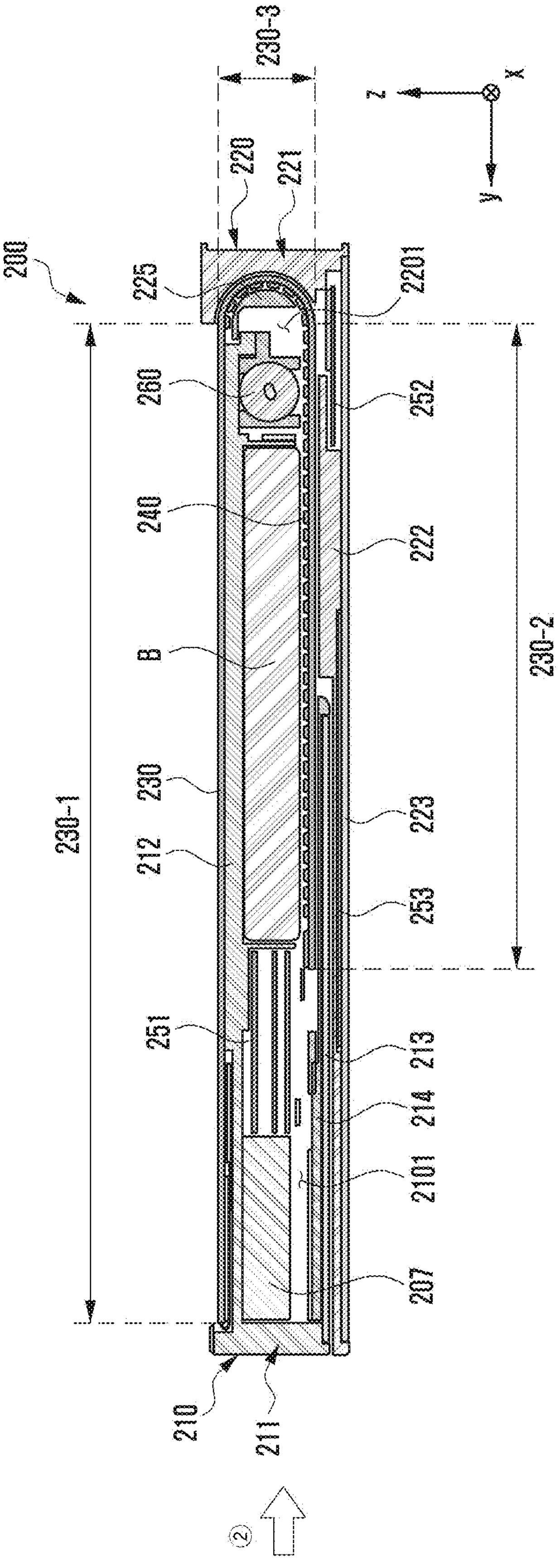
FIG. 5A is a cross-sectional view of an electronic device taken along line 5*a*-5*a* in FIG. 2A according to an embodiment of the disclosure.
Figure 5B:
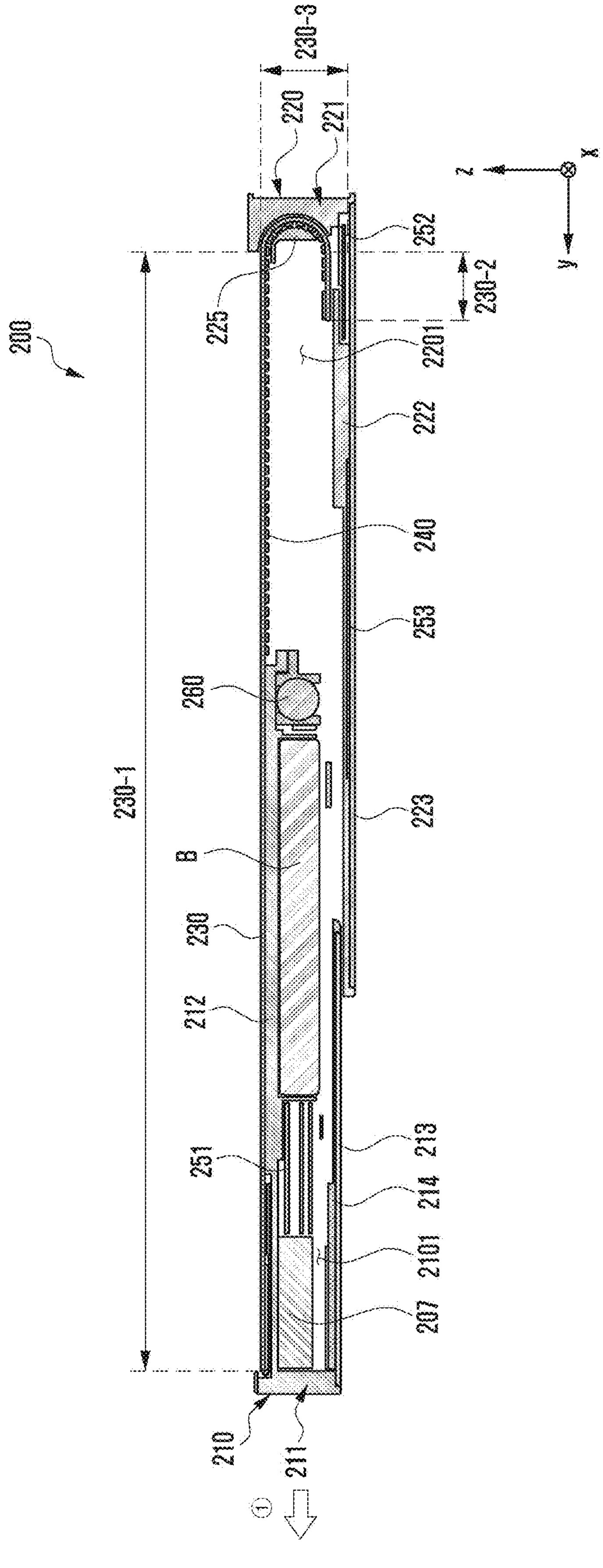
FIG. 5B is a cross-sectional view of an electronic device taken along line 5*b*-5*b* in FIG. 3A according to an embodiment of the disclosure.

FIG. 5A is a cross-sectional view of an electronic device taken along line 5*a*-5*a* in FIG. 2A according to an embodiment of the disclosure. FIG. 5B is a cross-sectional view of an electronic device taken along line 5*b*-5*b* in FIG. 3A according to an embodiment of the disclosure.

In describing the electronic device of FIGS. 5A and 5B, components that are substantially the same as those of the electronic device of FIG. 4 are assigned with the same reference numerals, and a detailed description thereof may be omitted.

Referring to FIGS. 5A and 5B, the electronic device 200 may include a first housing 210 having a first space 2101, a second housing 220 having a second space 2201, a bendable support member 240 connected to the first housing 210 and at least partially accommodated in the second space 2201 in a slide-in state, a flexible display 230 disposed to be supported by at least a portion of the bendable support member 240 and at least a portion of the first housing 210, and a drive motor 260 disposed in the first space 2101 and including a pinion gear meshing with a rack gear disposed in the second space 2201. According to an embodiment of the disclosure, the drive motor 260 may automatically move the first housing 210 in the slide-in direction (direction ②) or slide-out direction (direction ①) with respect to the second housing 220.

According to various embodiments of the disclosure, in the slide-in state of the electronic device 200, at least a portion of the first housing 210 may be accommodated in the second space 2201 of the second housing 220. According to an embodiment of the disclosure, the first support member 212 may be slidably coupled and guided by the support bracket 225 disposed in the second space 2201.

According to various embodiments of the disclosure, the flexible display 230 may include a display area 230-1, an accommodation area 230-2, and a bending area 230-3. The display area 230-1, the accommodation area 230-2, and the bending area 230-3 are conceptually divided into respective areas of the flexible display 230 for convenience of description. Accordingly, respective areas may not be physically or visually divided. The display area 230-1 may be an area where the flexible display 230 is visually recognized from the outside of the electronic device 200. Through the display area 230-1, the user may identify visual information displayed through the flexible display 230. The accommodation area 230-2 may be an area where the flexible display 230 is accommodated into the electronic device 200. The accommodation area 230-2 is a portion covered by other mechanical objects (e.g., the first housing 210, the second housing 220, the first support member 212, and/or the second support member 222), and may be an area that is not visually recognized from the outside of the electronic device 200. The bending area 230-3 may be an area between the display area 230-1 and the accommodation area 230-2. The bending area 230-3 may be a transformed area of the flexible display 230. The bendable support member 240 bent according to the shape of the guide rails 226 may support the bending area 230-3. Unlike the display area 230-1 and the accommodation area 230-2 which are substantially parallel to the sliding direction of the electronic device 200 (e.g., the Y direction in FIG. 5A), the bending area 230-3 may be an area in which the flexible display 230 is maintained in the transformed state.

In various embodiments of the disclosure, when the first housing 210 is slid in the first direction ① with respect to the second housing 220, the display area 230-1 may increase and the accommodation area 230-2 may decrease. In contrast, when the first housing 210 is slid in the second direction ② with respect to the second housing 220, the display area 230-1 may decrease and the accommodation area 230-2 may increase. The above-described sliding of the first housing 210 may be automatically executed by the drive motor 260.

According to various embodiments of the disclosure, the drive motor 260 and electronic components (e.g., the first board 251 and the battery B) arranged in the first housing 210 may move together according to the slide-in/slide-out operation of the first housing 210. Therefore, compared to the arrangement structure in which the corresponding components are arranged in the second housing 220 and connected to the first board 251 via electrical connection members, the electrical connection members are reduced, which may contribute to improving the operation reliability of the electronic device 200 and to design an efficient arrangement of electronic components.

Figure 6A:
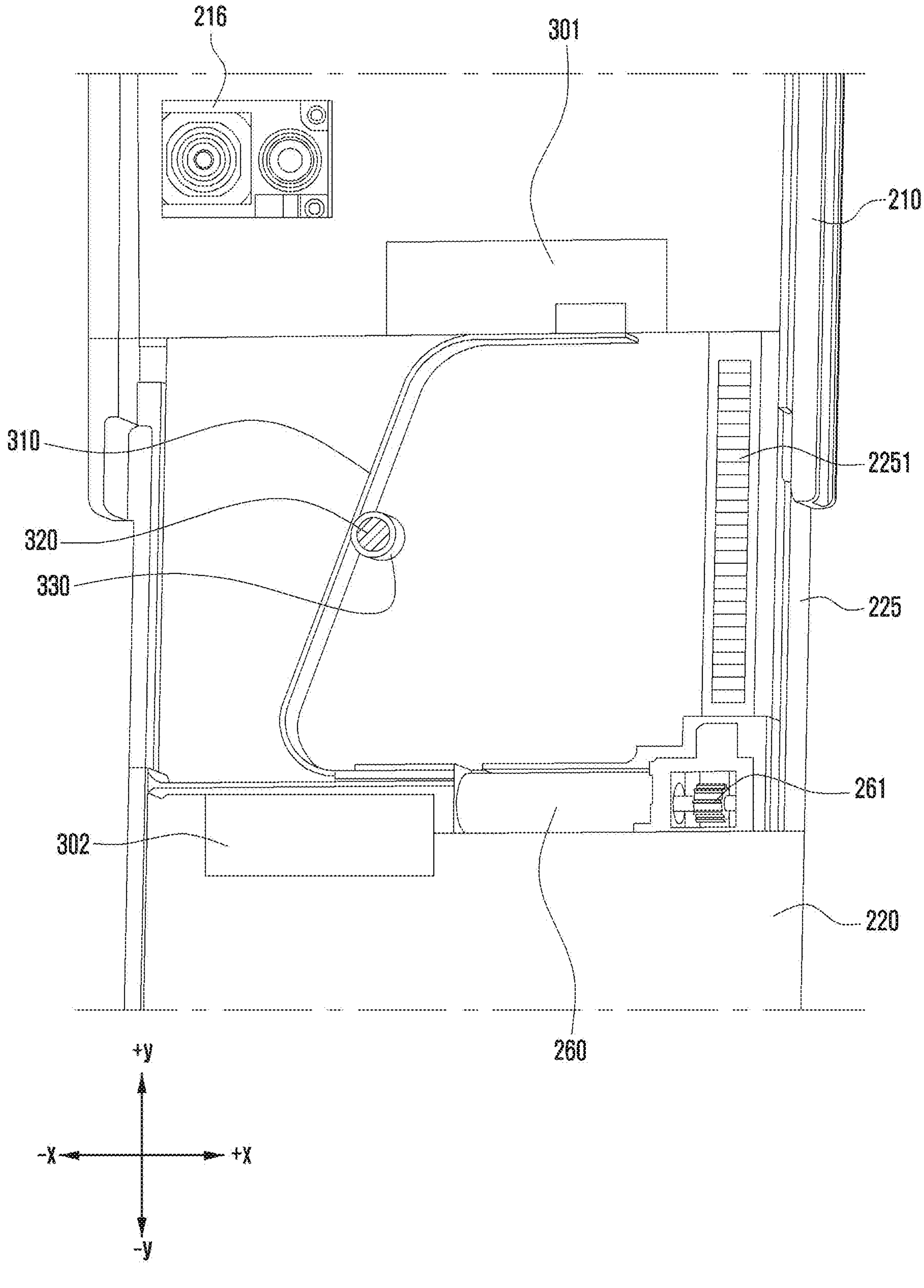
FIG. 6A is a view illustrating a connection member and a support structure in a slide-out state of an electronic device according to an embodiment of the disclosure.
Figure 6B:
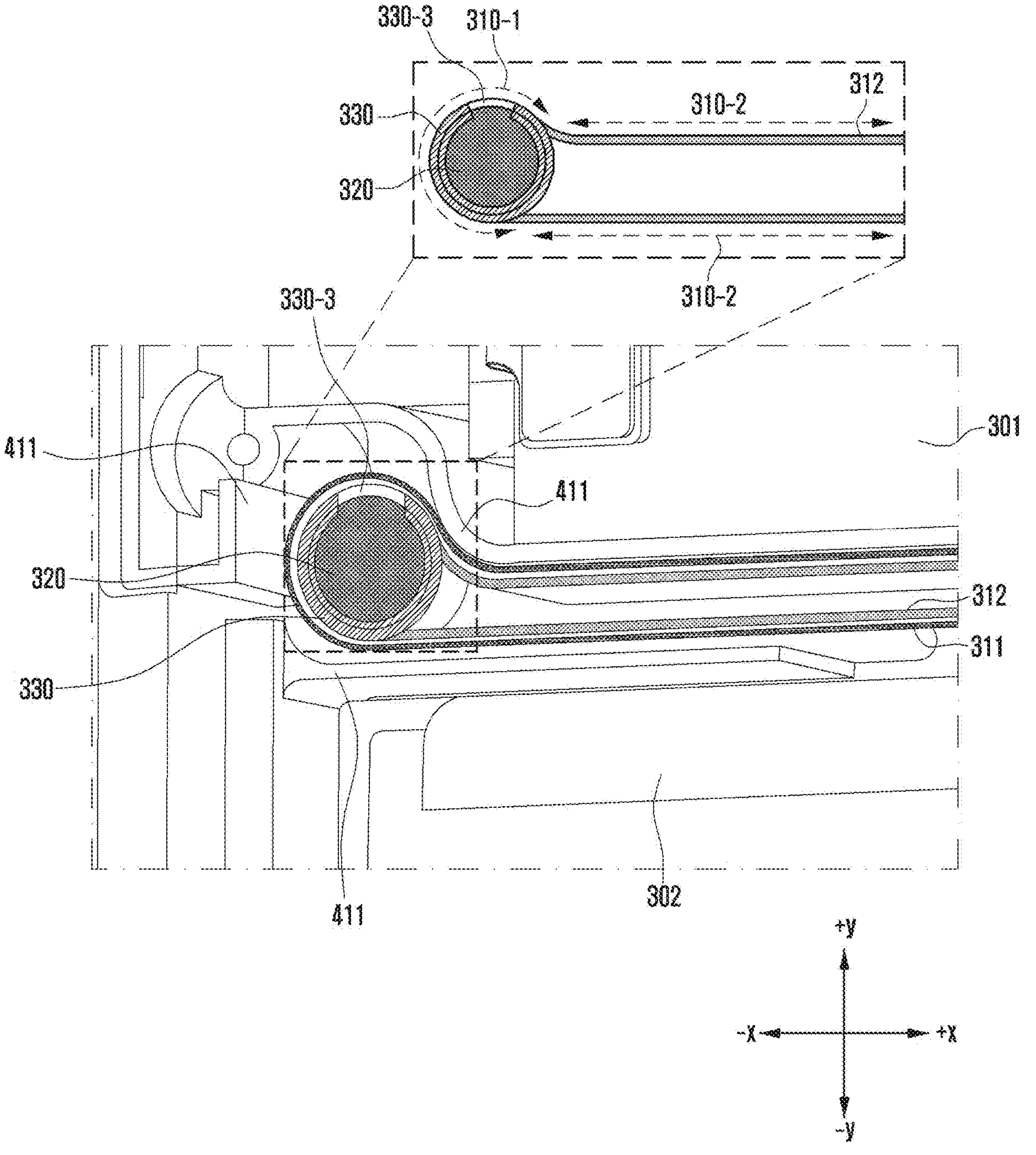
FIG. 6B is a view illustrating a connection member and a support structure in a slide-in state of an electronic device according to an embodiment of the disclosure.
Figure 6C:
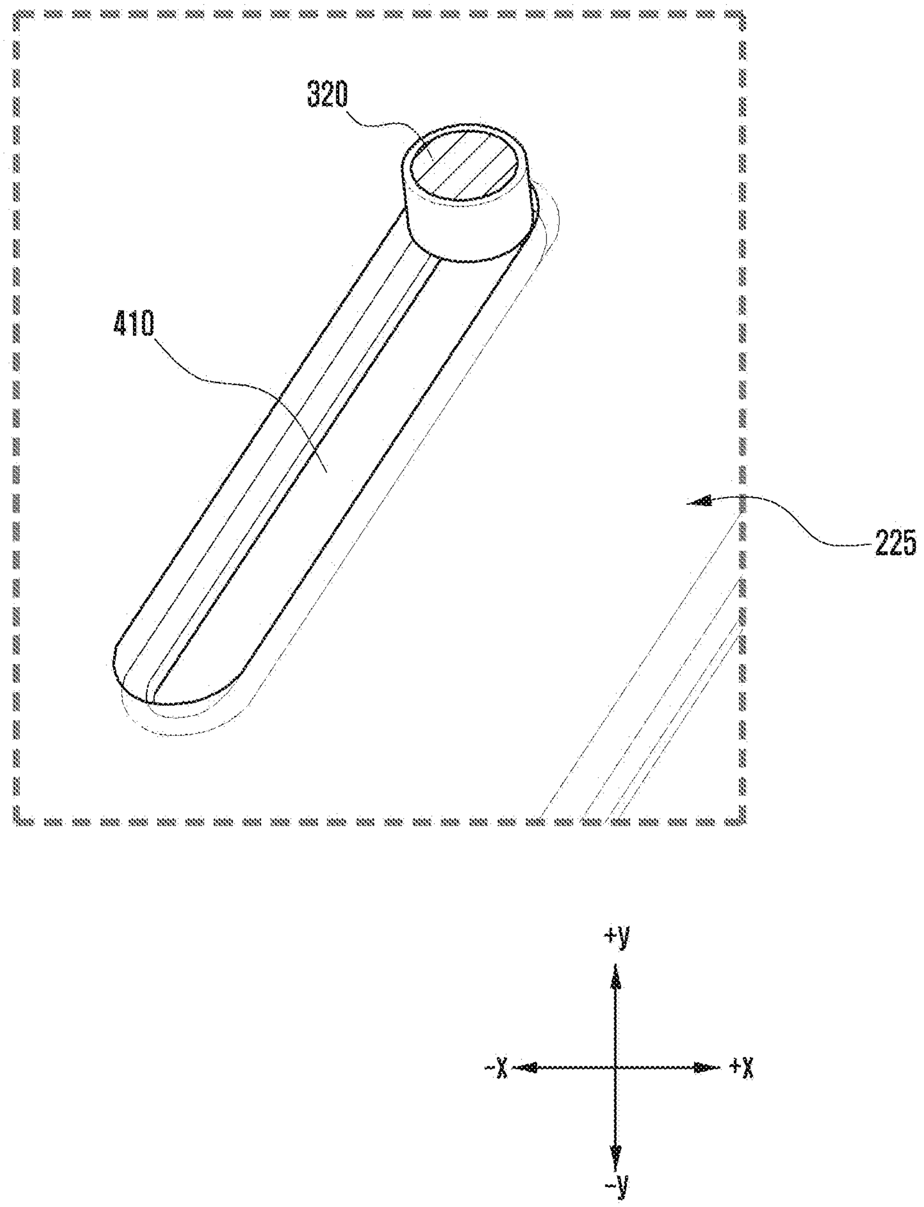
FIG. 6C is a view illustrating a support structure and a guide groove guiding a movement of a support structure according to an embodiment of the disclosure.

FIG. 6A is a view illustrating a connection member and a support structure in a slide-out state of an electronic device according to an embodiment of the disclosure. FIG. 6B is a view illustrating a connection member and a support structure in a slide-in state of an electronic device according to an embodiment of the disclosure. FIG. 6C is a view illustrating a support structure and a guide groove guiding a movement of a support structure according to an embodiment of the disclosure.

Since an electronic device to be described below includes similar components to the above-described electronic device 200 (e.g., the electronic device 101 in FIG. 1), detailed descriptions of overlapping components will be omitted, and unless necessary, the same or similar components will be described using the same reference numerals.

Referring to FIG. 6A, multiple printed circuit boards 301 and 302 may be disposed in the electronic device 200. The printed circuit boards 301 and 302 may include a first printed circuit board 301 (e.g., the first board 251 in FIG. 4 (e.g., the main board)) and a second printed circuit board 302 (e.g., the second board 252 in FIG. 4 (e.g., a sub-board)). In an embodiment of the disclosure, the first printed circuit board 301 may be disposed in the first housing 210. The second printed circuit board 302 may be disposed in the second housing 220. The first printed circuit board 301 may be electrically connected to multiple electronic components disposed in the first housing 210. For example, the first printed circuit board 301 may be electrically connected to a communication module 192 (e.g., the communication module 192 in FIG. 1), a camera module 216, a socket module 218 (e.g., a SIM tray), a speaker 207, a connector port 208, and a battery B. The second printed circuit board 302 may be electrically connected to multiple electronic components disposed in the second housing 220.

According to various embodiments of the disclosure, the electronic device 200 may include a connection member 310 that electrically connects the first printed circuit board 301 and the second printed circuit board 302. The connection member 310 may transmit electrical signals between electronic components connected to the first printed circuit board 301 and the second printed circuit board 302, respectively. In an embodiment of the disclosure, the connection member 310 may electrically connect an antenna member 330 (e.g., the antenna module 197 in FIG. 1) disposed on the connection member 310, which will be described below, and the communication module (192) disposed on the first printed circuit board 301. In an embodiment of the disclosure, the connection member 310 may be a component that transmits a radio frequency (RF) signal. The connection member 310 may transmit an RF signal processed by the communication module 192 of the electronic device 200 to the antenna member 330, or may transmit a RF signal received from the antenna member 330 to the communication module 192.

In an embodiment of the disclosure, a connector pin (not illustrated) located at one end of the connection member 310 may be connected to a connector (not illustrated) provided on the first printed circuit board 301. In addition, a connector pin (not illustrated) located at the other end of the connection member 310 may be connected to a connector (not illustrated) provided on the second printed circuit board 302. Therefore, electronic components disposed on the first printed circuit board 301 and the second printed circuit board 302 may be electrically connected through the connection member 310. In an embodiment of the disclosure, the connector pin (not illustrated) located at the one end of the connection member 310 may be integrated with the connection member 310.

In an embodiment of the disclosure, the connection member 310 may be configured to have a length or shape capable of accommodating the sliding distance in the electronic device 200. In an embodiment of the disclosure, the connection member 310 may be made of an elastic material that expands in the slide-out state and returns to its original position in the slide-in state. In an embodiment of the disclosure, the connection member 310 may include a flexible printed circuit board radio frequency cable FRC or a flexible printed circuit board FPCB. The connection member 310 may be made of a flexible material and may include multiple conductive lines. For example, the connection member 310 may include a power line, a signal line, and/or a ground line. For example, at least some of the conductive lines included in the connection member 310 may be electrically connected to electronic components disposed in the first housing 210 and/or electronic components disposed in the second housing 220.

According to various embodiments of the disclosure, the connection member 310 may include a first area 310-1 (e.g., a bending area) that is bent in response to sliding of the second housing 220 relative to the first housing 210 (or sliding of the first housing 210 relative to the second housing 220) and a second area 310-2 (e.g., a straight area) excluding the first area 310-1. Referring to FIG. 6B, the first area 310-1 of the connection member 310 may be bent in the state in which the first housing 210 is slide-in relative to the second housing 220 in a second direction. In this case, the first area 310-1 of the connection member 310 may be excessively folded when the electronic device 200 is in the slide-in state, or may be damaged by contact with a mechanical object located adjacent to the first area 310-1. According to various embodiments disclosed herein, as illustrated in FIGS. 6A and 6B, a support structure 320 that supports the connection member 310 may be disposed on the connection member 310. The support structure 320 may support an area where the connection member 310 is bent (e.g., the first area 310-1). Therefore, the phenomenon of the first area 310-1 of the connection member 310 being excessively bent or damaged by contact with a surrounding mechanical object during the process of slide-in in the electronic device 200 may be alleviated or resolved. The support structure 320 will be described in detail below.

According to various embodiments of the disclosure, as illustrated in FIGS. 6A and 6B, the support structure 320 that supports the connection member 310 may be disposed on the connection member 310. In an embodiment of the disclosure, the support structure 320 may be fixed to the first area 310-1 of the connection member 310 that is bent depending on the slide-in or slide-out in the electronic device 200. Accordingly, the connection member 310 may maintain a constant shape by the support structure 320 when the electronic device 200 is in the slide-in state. For example, referring to FIG. 6B, the first area 310-1 of the connection member 310 may be supported by the support structure 320 and may be bent into a shape having a certain curvature.

In an embodiment of the disclosure, the support structure 320 may be made of an elastic material, such as rubber, urethane, or foam (POM). Accordingly, the support structure 320 may protect the connection member 310 from external impact applied to the connection member 310. In an embodiment of the disclosure, the support structure 320 may have a circular cross-section to prevent the connection member 310 from being pressed. In this case, since the support structure 320 does not have a corner, the connection member 310 that comes into contact with the support structure 320 may not be pressed. Therefore, the connection member 310 may not be damaged by the support structure 320. In addition, when the electronic device 200 is in the slide-in state, the first area 310-1 of the connection member 310 may be bent into a shape having a predetermined curvature corresponding to the shape of the support structure 320.

According to various embodiments disclosed herein, the support structure 320 may be fixed to the first area 310-1 of the connection member 310 to support the first area 310-1. Accordingly, the first area 310-1 of the connection member 310 may be prevented from being excessively bent while the slide-in is being performed in the electronic device 200, and may be bent into a shape having a predetermined curvature corresponding to the shape of the support member. In addition, the support structure 320 may be made of an elastic material. Accordingly, the support structure 320 may protect the connection member 310 from an external force applied to the connection member 310. Accordingly, the phenomenon of the connection member 310 being damaged by contact with a surrounding structure while slide-in or slide-out is being performed in the electronic device 200 may be alleviated or resolved.

According to various embodiments of the disclosure, a guide groove 410 configured to guide the movement of the support structure 320 may be formed inside the electronic device 200. The guide groove 410 may be a movement path of the connection member 310 configured based on the motion of the connection member 310 bending or spreading while the slide-in or slide-out is being performed in the electronic device 200. The support structure 320 may be fixed to the first area 310-1 of the connection member 310 and may move along the guide groove 410 in response to the slide-in or slide-out in the electronic device 200. The connection member 310 may be guided to bend or spread in response to the introduction or withdrawal of the electronic device 200 through the support structure 320 and the guide groove 410.

In an embodiment of the disclosure, referring to FIG. 6C, the guide groove 410 may be formed in the second housing 220. In an embodiment of the disclosure, the guide groove 410 may be formed in a support bracket 225 (e.g., the support bracket 225 in FIG. 4) disposed in the second housing 220. The support bracket may be a mechanical object slidably coupled to the first support member 212 disposed in the first housing 210. The connection member 310 and the support structure 320 may be disposed in the support bracket 225, and their movement may be guided through the guide groove 410. In another embodiment of the disclosure, the guide groove 410 may be formed in the first housing 210. In an embodiment of the disclosure, the guide groove 410 may be formed in the first support member 212 disposed in the first housing 210.

In the following description, for convenience of description, it is assumed that the guide groove 410 is formed in the second housing 220 (e.g., the support bracket 225). Similarly, it is assumed that the support structure 320 and the connection member 310 moving along the guide groove 410 are disposed in the second housing 220. However, the above description is not limited to the guide groove 410 being formed in the support bracket 225. The guide groove 410 may be formed in various structures (e.g., the first support member 212) where the connection member 310 and the support structure 320 are located. In addition, the support structure 320 and the connection member 310 may be disposed in the first housing 210 and may move along the guide groove 410.

In an embodiment of the disclosure, the guide groove 410 may be formed in the form of a straight line and/or a curve. For example, the guide groove 410 can be formed in an arc shape in the support bracket 225.

Figure 7A:
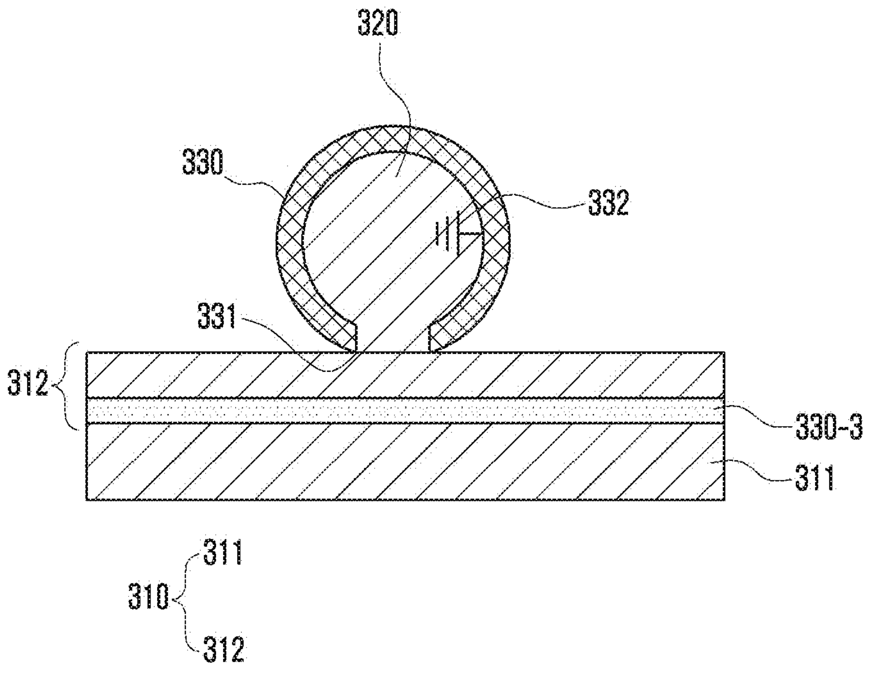
FIG. 7A is a cross-sectional view of a support structure and a connection member on which an antenna member is disposed according to an embodiment of the disclosure.
Figure 7B:
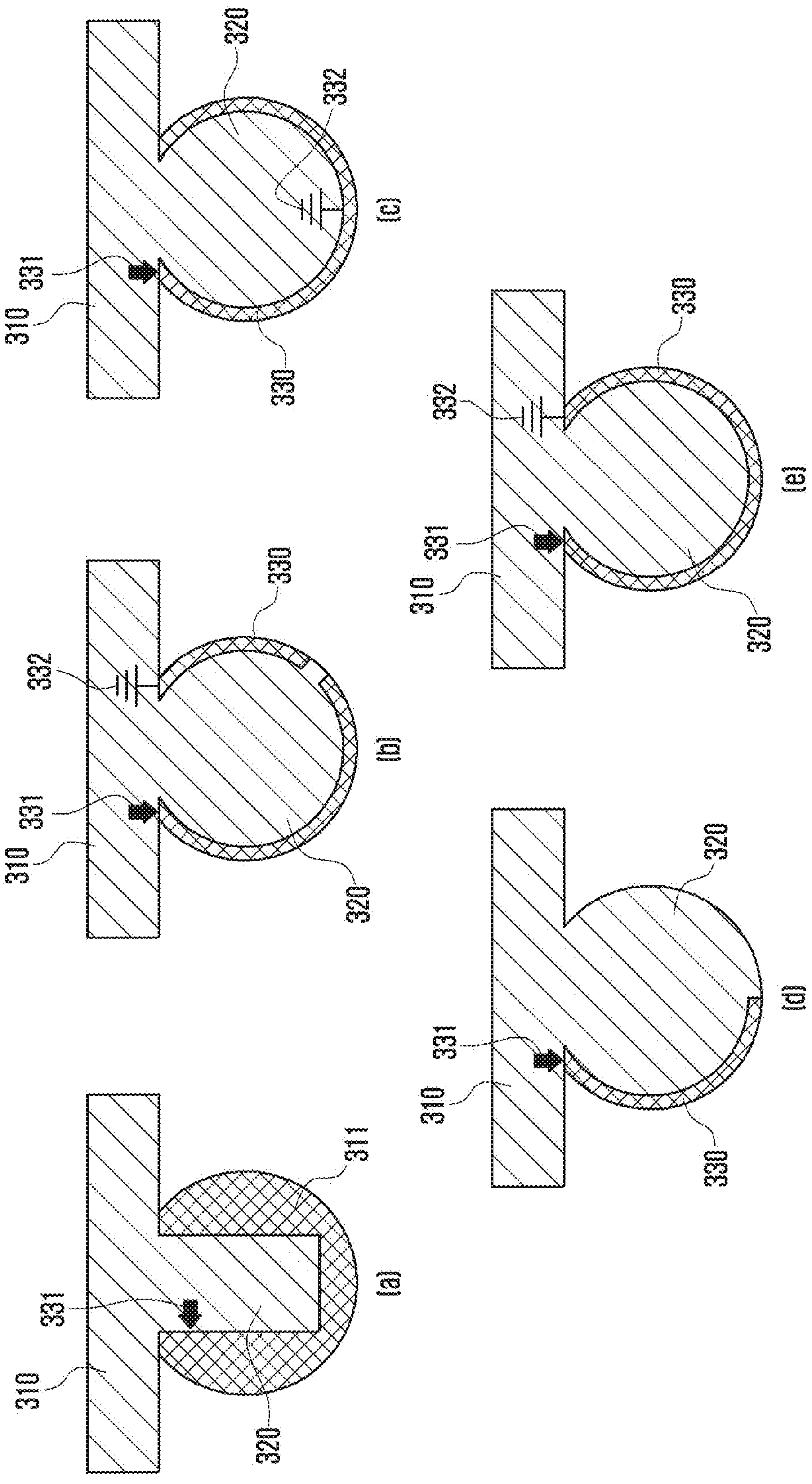
FIG. 7B is a view illustrating various embodiments of an antenna member disposed on a support structure according to an embodiment of the disclosure.

FIG. 7A is a cross-sectional view of a support structure and a connection member on which an antenna member is disposed according to an embodiment of the disclosure. FIG. 7B is a view illustrating various embodiments of the antenna member disposed on the support structure according to an embodiment of the disclosure.

Figure 8A:
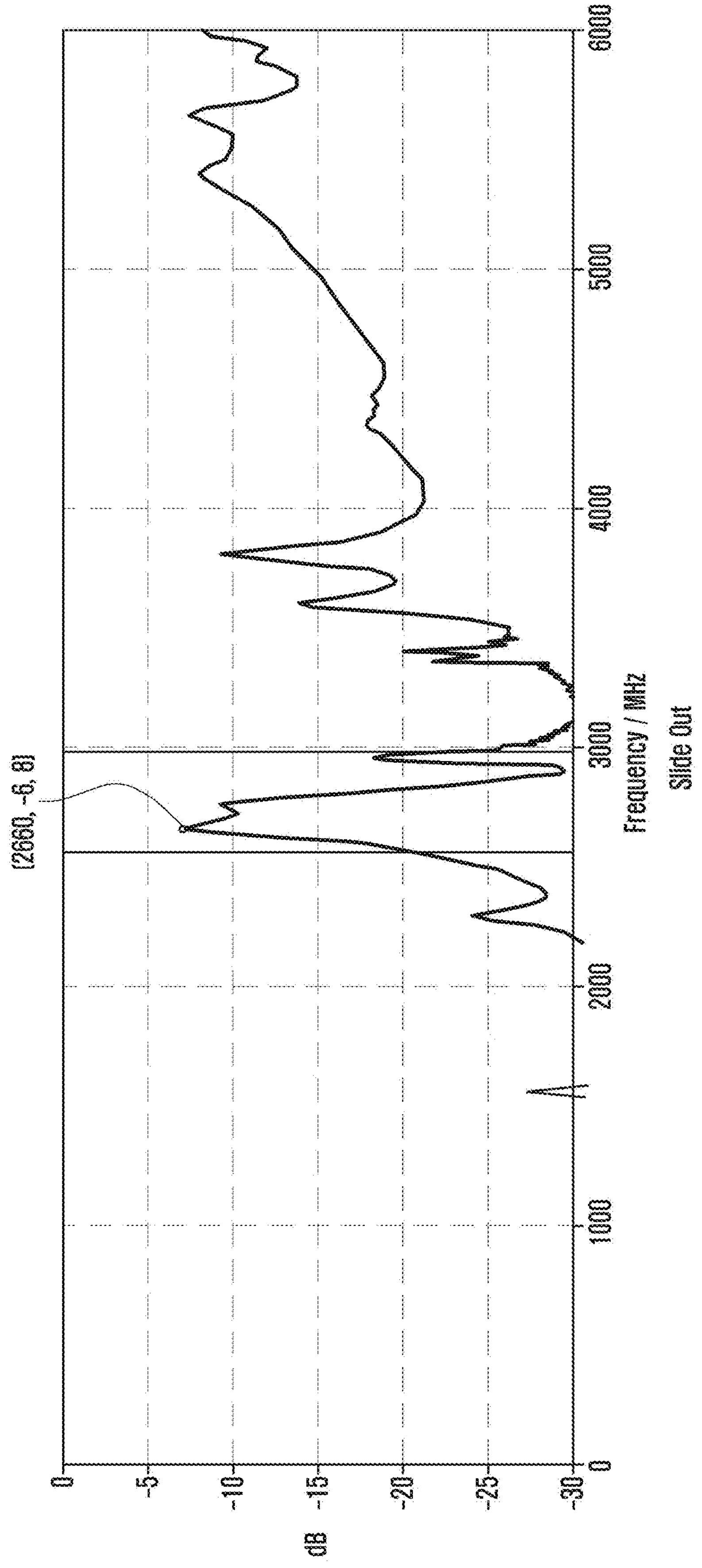
FIG. 8A is a view illustrating a performance of an antenna member disposed on a support structure when an electronic device is in a slide-out state according to an embodiment of the disclosure.
Figure 8B:
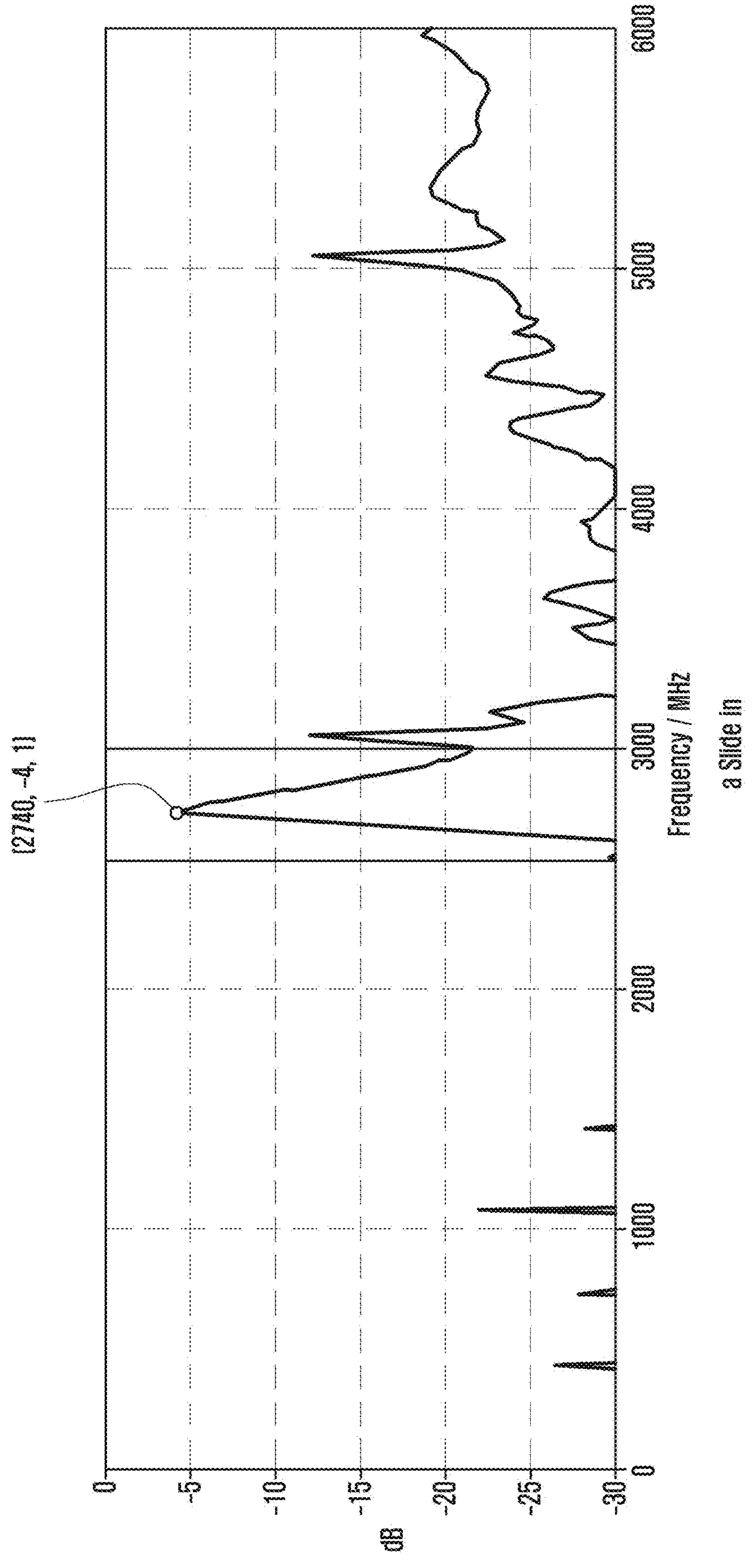
FIG. 8B is a view illustrating a performance of an antenna member disposed on a support structure when an electronic device is in a slide-in state according to an embodiment of the disclosure.

FIG. 8A is a view illustrating a performance of an antenna member disposed on a support structure when an electronic device is in the slide-out state according to an embodiment of the disclosure. FIG. 8B is a view illustrating a performance of an antenna member disposed on a support structure when an electronic device is in the slide-in state according to an embodiment of the disclosure.

Referring to FIGS. 7A and 7B, an antenna member 330 (e.g., the antenna module 197 in FIG. 1) may be disposed on a connection member 310. The antenna member 330 may be made a conductive material and may conduct communication with an external electronic device. In an embodiment of the disclosure, the antenna member 330 may include a near-field communication NFC antenna, a wireless charging antenna, a magnetic secure transmission (MST), and/or a high-frequency (e.g., WiFi, LTE, or mmWave) antenna. The antenna member 330 may, for example, perform short-range or long-range communication with an external electronic device, or wirelessly transmit and receive power required for charging. In addition, the antenna member 330 may wirelessly transmit or receive a communication signal to or from an external electronic device at various bandwidths.

According to various embodiments of the disclosure, the antenna member 330 may be electrically connected to a communication module 192 disposed on a first printed circuit board 301 (e.g., the first board 251 in FIG. 4) to transmit or receive a communication signal (e.g., an RF signal) to or from an external electronic device. In an embodiment of the disclosure, the antenna member 330 may be electrically connected to the communication module 192 through the connection member 310. As described above, the connection member 310 may be a component configured to transmit a radio frequency (RF) signal. The connection member 310 may transmit an RF signal processed by the communication module 192 of the electronic device 200 to the antenna member 330, or may transmit an RF signal received from the antenna member 330 to the communication module 192.

According to various embodiments of the disclosure, the connection member 310 may include multiple circuit parts. For example, the connection member 310 may include various antenna-related circuits, such as a matching circuit for impedance matching and a switching circuit configured to allow an antenna to correspond to a broadband characteristic. In an embodiment of the disclosure, the matching circuit may be a circuit that matches impedances, including elements, such as an inductor or a capacitor. In an embodiment of the disclosure, the switching circuit may increase the physical length of an antenna radiator (e.g., the antenna member 330) by shorting antenna radiators that are electrically open to each other. The matching circuit and switching circuit of the circuit parts described above should not be interpreted as limited by their names, but should be understood as circuits that include elements capable of performing the corresponding functions. For example, the switching circuit may be referred to as a switching circuit part, and the matching circuit may be referred to as a variable element part. In an embodiment of the disclosure, among the antenna-related circuits, the matching circuit or switching circuit may be partially omitted.

According to various embodiments of the disclosure, the antenna member 330 may be integrated with the connection member 310. For example, the antenna member 330 may be a radiator including a conductor 330-1 formed on a substrate 330-3 (e.g., a PCB) included in the connection member 310 or a conductive pattern formed of a conductor 330-1 and an insulator 330-2. In an embodiment of the disclosure, the antenna member 330 may be a radiator including a conductive pattern formed of a conductor 330-1 and an insulator 330-2, and created by etching the connection member 310. For example, the antenna member 330 may be formed as a multi-layer structure and may include a via. In addition, the antenna member 330 may be integrated with the connection member 310 in various ways, and in other embodiments of the disclosure, the antenna member 330 may be formed as a separate module and connected to the connection member 310. According to various embodiments of the disclosure, as illustrated in FIGS. 6A, 6B, 6C, 7A, and 7B, the antenna member 330 may be disposed to surround at least a portion of the support structure 320 fixed to the first area 310-1 of the connection member 310. In an embodiment of the disclosure, referring to FIG. 7A, the antenna member 330 may be disposed to surround the support structure 320. Referring to FIG. 7A, a feed portion 331 where a signal from the antenna member 330 starts may be formed at a point where the antenna member 330 is bent along the support structure 320 in the connection member 310.

In an embodiment of the disclosure, referring to FIG. 7B, the antenna member 330 may be formed with various conductive patterns to perform communication in a desired band. In an embodiment of the disclosure, the antenna member may implement various types of antennas by changing the length of the conductor 330-1 and the point of a ground 332. For example, the antenna member 330 may implement an antenna, such as a slit antenna (e.g., part (a) of FIG. 7B), a dual inverted f antenna (Dual-IFA) (e.g., part (b) of FIG. 7B), an inverted f antenna (IFA) (e.g., part (c) of FIG. 7B), a mono antenna (e.g., part (d) of FIG. 7B), and a loop antenna (e.g., part (e) of FIG. 7B) depending on the conductive pattern formed of the conductor 330-1 and the insulator 330-2. The antenna member 330 may implement various types of antennas through various conductive patterns other than the conductive pattern illustrated in FIG. 7B described above.

According to various embodiments disclosed herein, the antenna member 330 may be disposed on the connection member 310 as illustrated in FIGS. 7A and 7B. The antenna member 330 may be disposed on the support structure 320 fixed to the connection member 310. In this case, a separate space for disposing the antenna member 330 inside the electronic device 200 may not be formed. Therefore, the antenna member 330 may be disposed on a mechanical object (e.g., the support structure 320) located inside the electronic device 200 without a separate arrangement space inside the electronic device 200 to perform communication with an external electronic device.

In an embodiment of the disclosure, referring to FIGS. 6B and 7A, the connection member 310 can include a first connection member 311 and a second connection member 312. The first connection member 311 and the second connection member 312 may be bonded through an adhesive member disposed therebetween. The first connection member 311 and the second connection member 312 may transmit electrical signals between electronic components connected to the first printed circuit board 301 (e.g., the first board 251 in FIG. 4) and the second printed circuit board 302 (e.g., the second board 252 in FIG. 4), respectively. In an embodiment of the disclosure, different electrical signals be transmitted to the first connection member 311 and the second connection member 312. For example, a signal regarding power generated from the battery B may be transmitted to the first connection member 311. Signals generated from the communication module 192 and the antenna member 330 may be transmitted to the second connection member 312.

In an embodiment of the disclosure, the support structure 320 and the antenna member 330 may be disposed on the second connection member 312. The support structure 320 may be disposed in the first area 310-1 of the second connection member 312 that is bent depending on slide-in or slide-out in the electronic device 200. In an embodiment of the disclosure, referring to FIG. 6B, the antenna member 330 may be a radiator including a conductor 330-1 formed on a substrate 330-3 (e.g., a PCB) included in the connection member 312 or a conductive pattern formed of a conductor 330-1 and an insulator 330-2. The antenna member 330 may be integrated with the second connection member 312 or may be disposed as a separate module on the second connection member 312 to surround the support structure 320.

According to various embodiments of the disclosure, the support structure 320 may be made of a non-conductive material. In an embodiment of the disclosure, the support structure 320 may be made of an elastic non-conductive material, such as rubber, urethane, or foam (POM), as described above. Therefore, the antenna member 330 disposed on the support structure 320 may not experience antenna deterioration caused by the support structure 320 since the support structure 320 is made of a non-conductive material.

Referring to FIGS. 8A and 8B, the antenna performance may be verified when the antenna member 330 is disposed on the support structure 320. In an embodiment of the disclosure, referring to FIG. 8A, it may be verified that the antenna member 330 achieves higher antenna performance in the 2,500 MHz to 3,000 MHz band than in other bands when the electronic device 200 is in the slide-out state. For example, referring to FIG. 8A, the antenna member 330 may have about −6.8 db in the 2,660 MHz band when the electronic device 200 is in the slide-out state. In an embodiment of the disclosure, the antenna member 330 may experience less antenna deterioration when the electronic device 200 is in the slide-out state than when it is in the slide-in state since it is separated from the surrounding electronic components. In an embodiment of the disclosure, referring to FIG. 8B, it may be verified that higher antenna performance is achieved in the 2500 MHz to 3500 MHz band than in other bands when the electronic device 200 is in the slide-in state. For example, referring to FIG. 8B, the antenna member 330 may have about −4.1 db in the 2,740 MHz band when the electronic device 200 is in the slide-in state. Therefore, as illustrated in FIGS. 8A and 8B, the antenna member 330 may achieve antenna performance in a specific band even when it is disposed on the support structure 320.

According to various embodiments of the disclosure, the antenna member 330 may move along the guide groove 410 together with the support structure 320 while the electronic device 200 is being switched into the slide-in state or the slide-out state. In an embodiment of the disclosure, the antenna member 330 may move along the guide groove 410 together with the support structure 320 with respect to the second housing 220 where the guide groove 410 is formed. In an embodiment of the disclosure, the antenna member 330 may face the partition wall 411 formed in the second housing 220 depending on whether the electronic device 200 is in the slide-in state or the slide-out state. For example, referring to FIG. 6B, the antenna member 330 may face the partition wall 411 of the second housing 220 when the electronic device 200 is in the slide-in state. In an embodiment of the disclosure, the second housing 220 may be made of a metal material to ensure a certain level or more of rigidity. For example, the support bracket 225 (e.g., the support bracket 225 in FIG. 4) in which the guide groove 410 is formed in the second housing 220 may be made of a metal material. In this case, the partition wall 411, which is a portion of the second housing 220, may deteriorate the radiation performance of the antenna member 330 since it is made of a metal material. In various embodiments disclosed herein document, at least a portion of the partition wall 411 facing the antenna member 330 may be made of a non-conductive material. Therefore, the antenna member 330 may ensure the antenna radiation performance even when it faces the partition wall 411 when the electronic device 200 is in the slide-in state or the slide-out state.

Figure 9A:
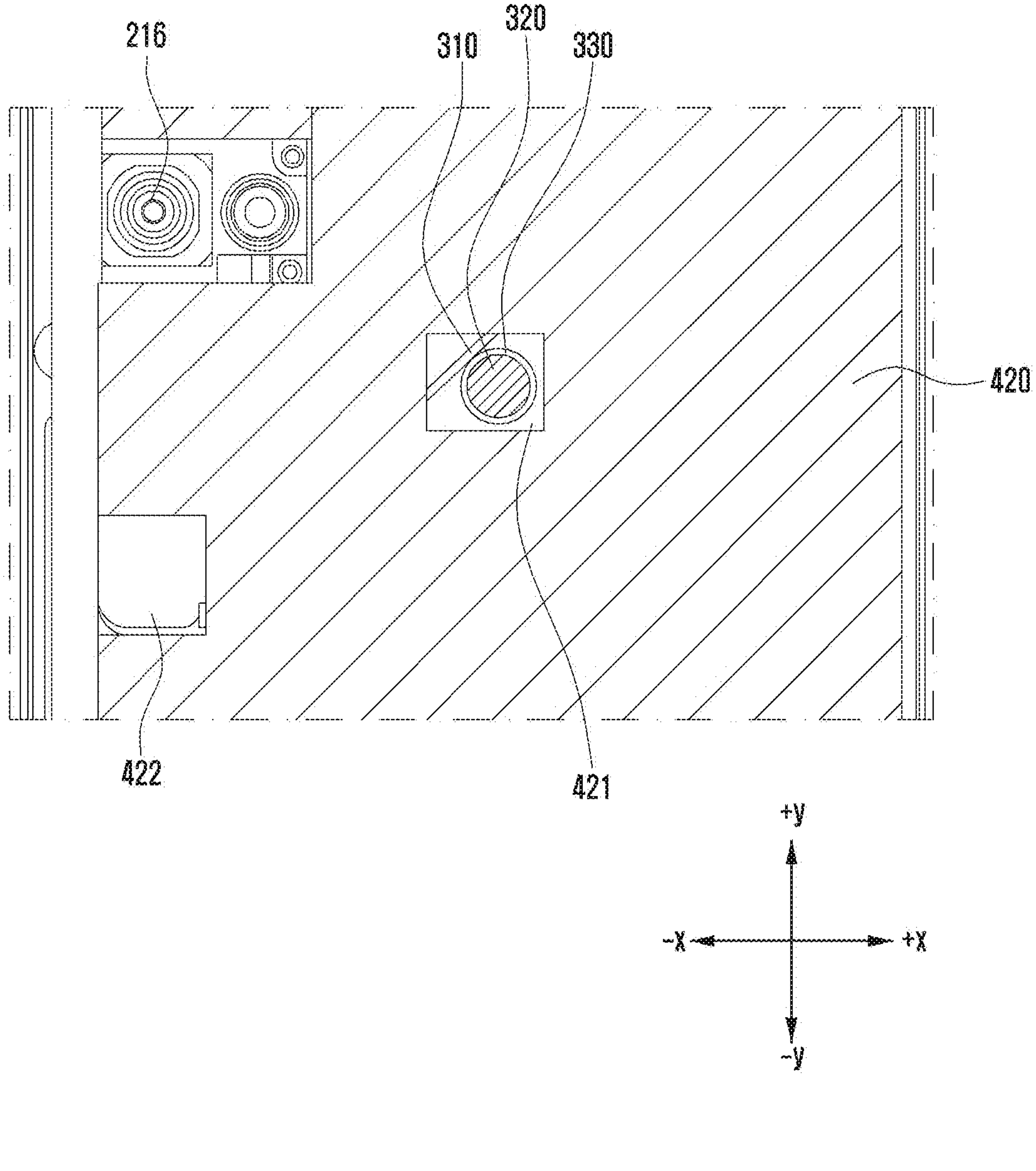
FIG. 9A is a view illustrating a state in which an antenna member is located in a first opening formed in a rear bracket when an electronic device is in a slide-out state according to an embodiment of the disclosure.
Figure 9B:
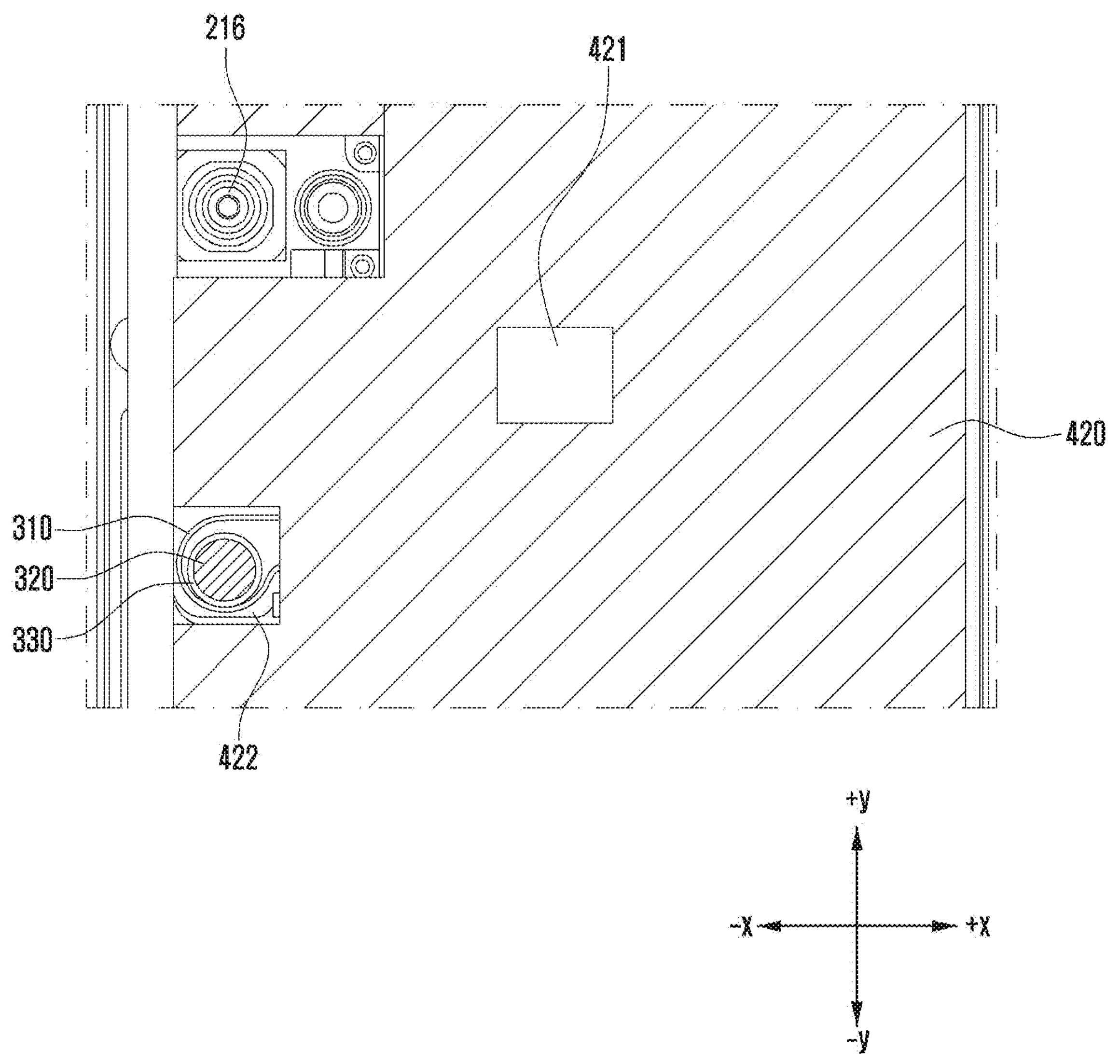
FIG. 9B is a view illustrating a state in which an antenna member is located in a second opening formed in a rear bracket when an electronic device is in a slide-in state according to an embodiment of the disclosure.
Figure 9C:
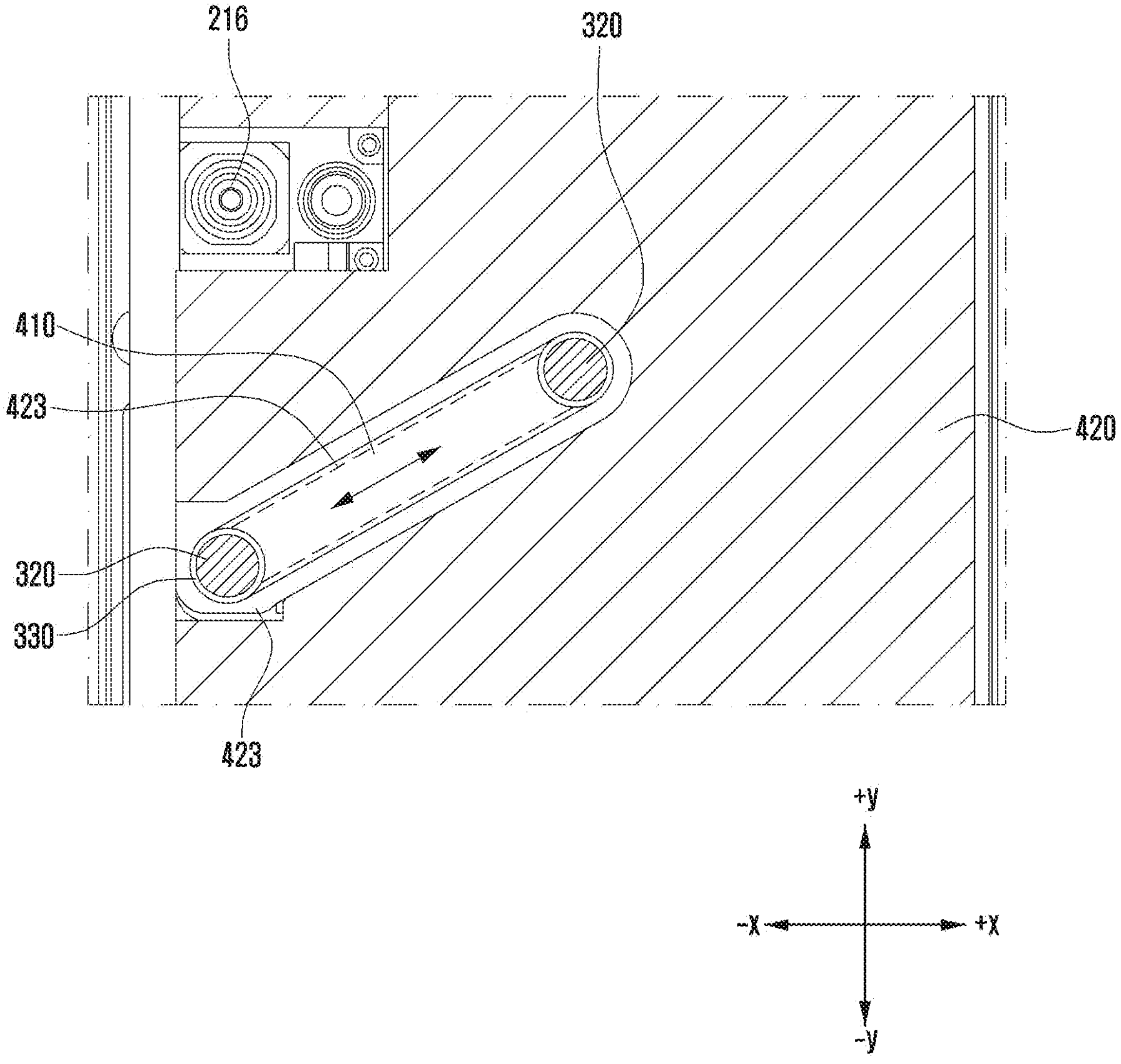
FIG. 9C is a view illustrating a state in which an opening having a shape corresponding to a guide groove is formed in a rear bracket according to an embodiment of the disclosure.

FIG. 9A is a view illustrating a state in which an antenna member is located in a first opening formed in a rear bracket when an electronic device is in a slide-out state according to an embodiment of the disclosure. FIG. 9B is a view illustrating a state in which an antenna member is located in a second opening formed in a rear bracket when an electronic device is in the slide-in state according to an embodiment of the disclosure. FIG. 9C is a view illustrating a state in which an opening having a shape corresponding to a guide groove is formed in a rear bracket according to an embodiment of the disclosure.

According to various embodiments of the disclosure, in the electronic device 200, at least some of multiple electronic components may be disposed in and covered by at least one of the first housing 210 and the second housing 220. In an embodiment of the disclosure, the rear bracket 420 (e.g., the rear bracket 214 of FIG. 4) may be structurally coupled to at least a portion of the first support member 212 (e.g., the first support member 212 in FIG. 4) disposed in the first housing 210. The rear bracket 420 may be disposed to cover the multiple electronic components and to support the first rear surface cover 213 (e.g., the first rear surface cover 213 in FIG. 4). In an embodiment of the disclosure, the rear bracket 420 may be disposed in the second housing 220 to cover the connection member 310, the support structure 320, and the antenna member 330 (e.g., the antenna module 197 in FIG. 1) located in the second housing 220 (e.g., the support bracket 225).

In an embodiment of the disclosure, the rear bracket 420 may be made of a metal material to ensure a certain level or more of rigidity. In this case, the antenna member 330 may experience deterioration in antenna radiation performance as it is covered by the rear bracket 420 made of the metal material. According to various embodiments disclosed herein, as illustrated in FIGS. 9A and 9B, the rear bracket 420 may include a first opening 421 and a second opening 422 spaced apart from the first opening 421. In an embodiment of the disclosure, referring to FIG. 9A, the first opening 421 may be disposed at a position corresponding to the position of the antenna member 330 disposed on the support structure 320 when the electronic device 200 is in the slide-out state in which the first housing 210 is moved in the first direction relative to the second housing 220. In addition, referring to FIG. 9B, the second opening 422 may be disposed at a position corresponding to the position of the antenna member 330 disposed on the support structure 320 when the electronic device 200 is in the slide-in state in which the first housing 210 is moved in the second direction relative to the second housing 220. The antenna member 330 may be located in the first opening 421 or the second opening 422 formed in the rear bracket 420 depending on whether the electronic device 200 is in the slide-in state or the slide-out state. Therefore, as the first opening 421 and the second opening 422 are formed in the rear bracket 420, the deterioration of the antenna radiation performance of the antenna member 330 caused by the rear bracket 420 may be alleviated or resolved.

In an embodiment of the disclosure, referring to FIG. 9C, the rear bracket 420 may include a third opening 423 formed in a shape corresponding to the guide groove 410 formed in the second housing 220. The third opening 423 may be formed in a direction corresponding to the movement path of the support structure 320 and the antenna member 330 moving along the guide groove 410. In this case, the antenna member 330 may face the third opening 423 formed in the rear bracket 420 in the middle area between the area where the electronic device 200 is in the slide-in or slide-out state and the area where the electronic device 200 is slid. Therefore, as the third opening 423 is formed, the deterioration of the antenna radiation performance of the antenna member 330 caused by the rear bracket 420 may be alleviated or resolved.

Figure 10A:
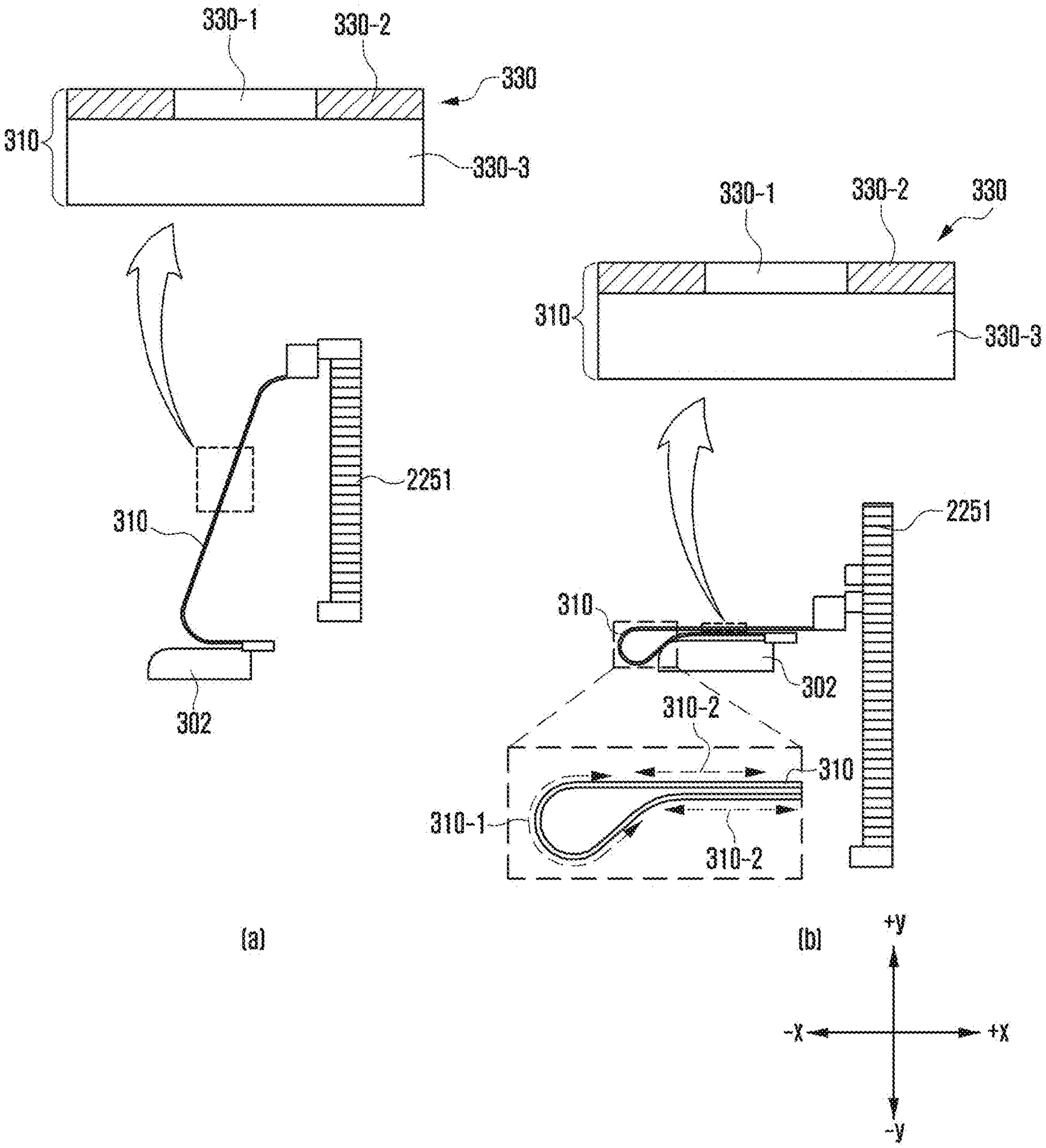
FIG. 10A is a view illustrating a state in which an antenna member is disposed on a connection member according to an embodiment of the disclosure.
Figure 10B:
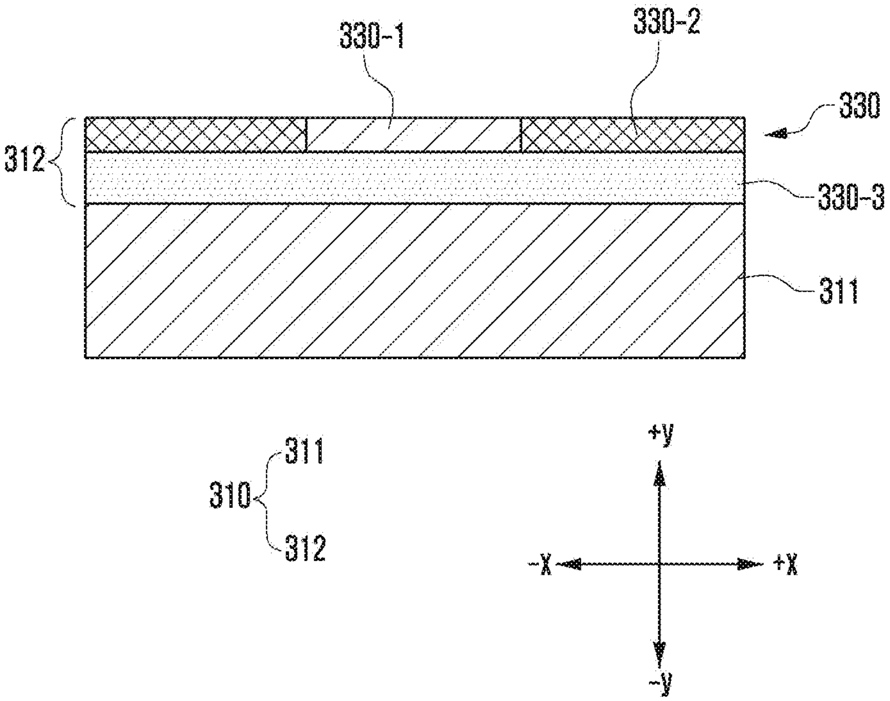
FIG. 10B is a cross-sectional view of an antenna member and a connection member according to an embodiment of the disclosure.

FIG. 10A is a view illustrating a state in which an antenna member is disposed on a connection member according to an embodiment of the disclosure. FIG. 10B is a cross-sectional view of an antenna member and a connection member according to an embodiment of the disclosure.

Figure 11A:
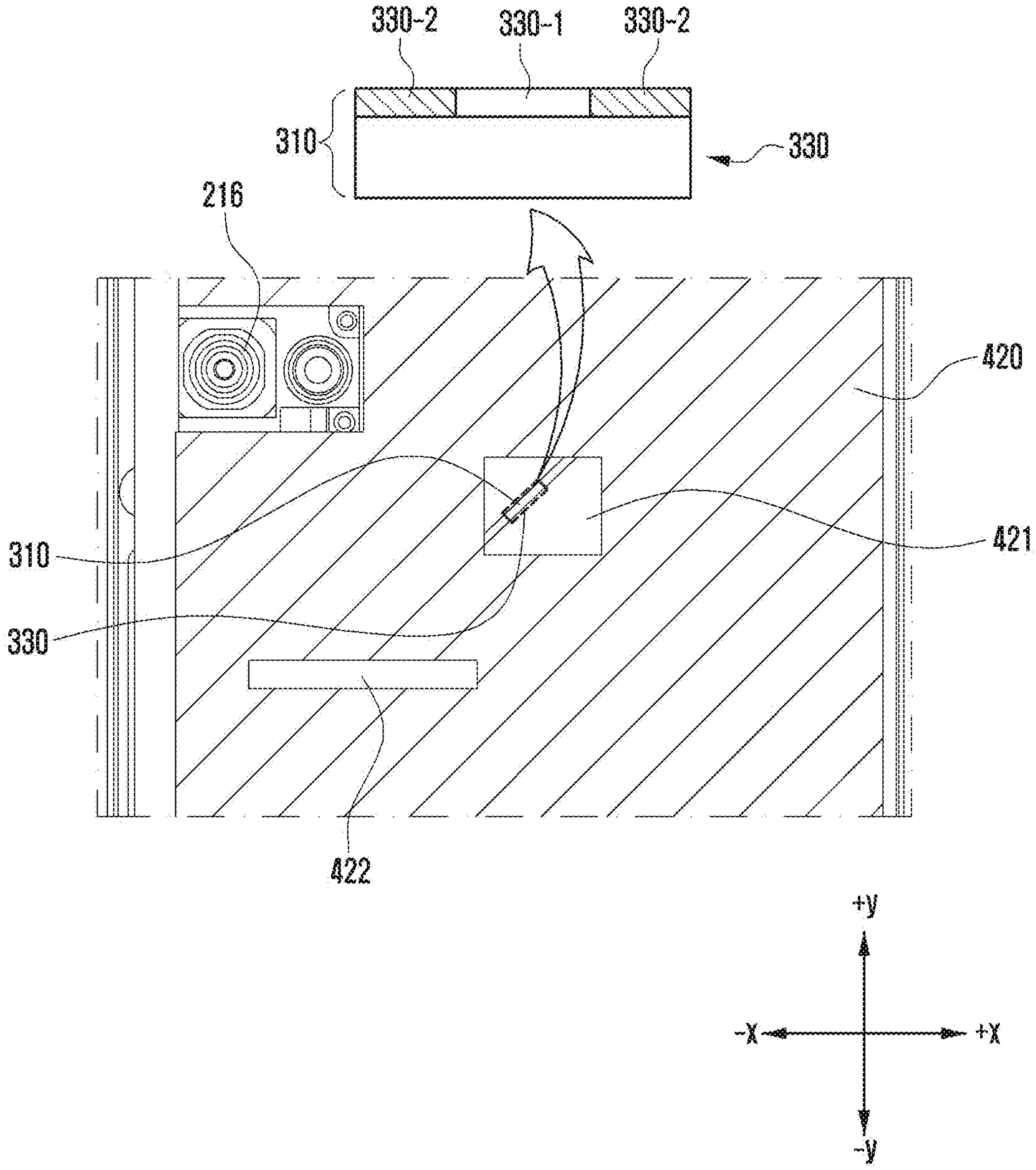
FIG. 11A is a view illustrating a state in which an antenna member is located in a first opening formed in a rear bracket when an electronic device is in a slide-out state according to an embodiment of the disclosure.
Figure 11B:
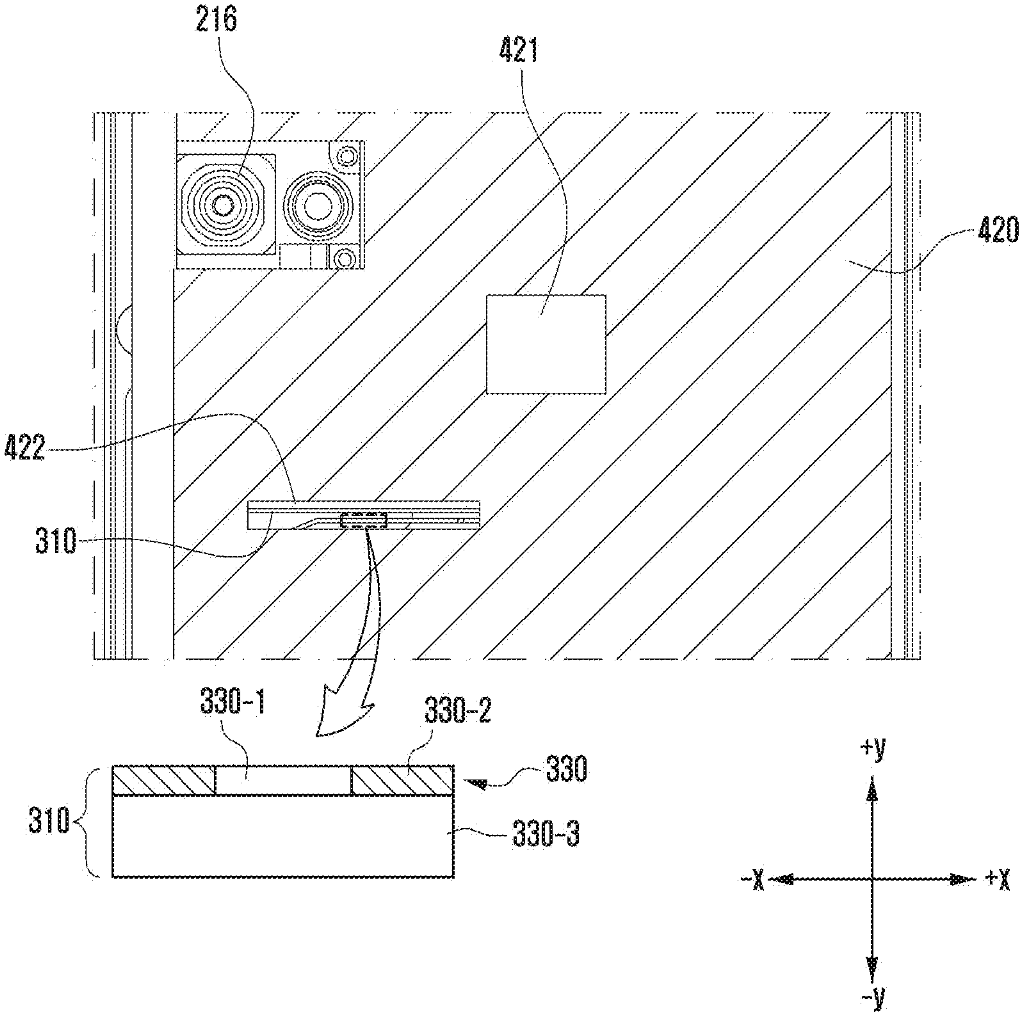
FIG. 11B is a view illustrating a state in which an antenna member is located in a second opening formed in a rear bracket when an electronic device is in a slide-in state according to an embodiment of the disclosure.

FIG. 11A is a view illustrating a state in which an antenna member is located in a first opening formed in a rear bracket when an electronic device is in a slide-out state according to an embodiment of the disclosure. FIG. 11B is a view illustrating a state in which an antenna member is located in a second opening formed in a rear bracket when an electronic device is in a slide-in state, according to an embodiment of the disclosure.

Hereinbelow, an embodiment of the disclosure will be described in which the antenna member 330 (e.g., the antenna module 197 in FIG. 1) described above with reference to FIGS. 6A, 6B, 6C, 7A, 7B, 8A, 8B, 9A, 9B, and 9C is disposed in an area (e.g., the second area 310-2) of a connection member 310 rather than the support structure 320. In addition, in the embodiment described below, it is assumed that the support structure 320 described above is not disposed on the connection member 310. However, it may not mean that an embodiment in which the support structure 320 is disposed on the connection member 310 is excluded. In an embodiment of the disclosure, the support structure 320 may be disposed in the first area 310-1 of the connection member 310, and the antenna member 330 may be disposed in the second area 310-2.

Since components similar to those of the electronic device 200 described above are included, a detailed description of overlapping components will be omitted, and unless necessary, the same or similar components will be described using the same reference numerals.

According to various embodiments of the disclosure, as illustrated in FIGS. 10A and 10B, the antenna member 330 may be disposed on the connection member 310. In an embodiment of the disclosure, referring to parts (a) and (b) of FIG. 10A, the connection member 310 may include a first area 310-1 (e.g., a bending area) that is bent in response to the sliding of the second housing 220 relative to the first housing 210 (or the sliding of the first housing 210 relative to the second housing 220) as described above, and a second area 310-2 (e.g., a straight area) excluding the first region 310-1. The second area 310-2 may be an area that is relatively less bent than the first area 310-1 that is bent in response to the switching of the electronic device 200 into the slide-in state or the slide-out state. In an embodiment of the disclosure, the antenna member 330 may be disposed in the second area 310-2 of the connection member 310 not to be bent.

In an embodiment of the disclosure, referring to FIGS. 10A, 10B, 11A, and 11B, the antenna member 330 may be integrated with the connection member 310. For example, referring to FIGS. 10A, 11A, and 11B, the antenna member 330 may be a radiator including a conductor 330-1 formed on a substrate 330-3 (e.g., a PCB) included in the connection member 310 or a conductive pattern formed of a conductor 330-1 and an insulator 330-2. In an embodiment of the disclosure, the antenna member 330 may be a radiator including a conductive pattern formed of a conductor 330-1 and an insulator 330-2, and created by etching the connection member 310. In addition, the antenna member 330 may be integrated with the connection member 310 in various ways.

In an embodiment of the disclosure, the antenna member 330 may be provided as a separate module and connected to the connection member 310. The connection member 310 may include a groove (not illustrated) formed to allow the antenna member 330 to be disposed in the second area

310-2. The antenna member 330 may be seated in the groove formed in the connection member 310 and electrically connected to the connection member 310.

According to various embodiments of the disclosure, as illustrated in FIG. 10B, the connection member 310 may include a first connection member 311 and a second connection member 312. As described above, the first connection member 311 and the second connection member 312 may be bonded via an adhesive material. In an embodiment of the disclosure, the antenna member 330 may be disposed on the second connection member 312. The antenna member 330 may be provided in the second area 310-2 that is less deformed than the first area 310-1 that is bent in response to the switching of the electronic device 200 into the slide-in state or the slide-out state. In an embodiment of the disclosure, referring to FIG. 10B, the antenna member 330 may be a radiator including a conductor 330-1 formed on a substrate 330-3 (e.g., a PCB) included in the second connection member 312 or a conductive pattern formed of a conductor 330-1 and an insulator 330-2. In some embodiments of the disclosure, the antenna member 330 may be provided as a separate module and disposed on the second connection member 312.

According to various embodiments of the disclosure, as illustrated in FIGS. 11A and 11B, the rear bracket 420 (e.g., the rear bracket 420 in FIG. 4) may include a first opening 421 and a second opening 422 spaced apart from the first opening 421. In an embodiment of the disclosure, referring to FIG. 11A, the first opening 421 may be disposed at a position corresponding to the position of the antenna member 330 disposed in the second area 310-2 of the connection member 310 when the electronic device 200 is in the slide-out state in which the first housing 210 is moved in the first direction relative to the second housing 220. In addition, referring to FIG. 11B, the second opening 422 may be disposed at a position corresponding to the position of the antenna member 330 disposed in the second area 310-2 of the connection member 310 when the electronic device 200 is in the slide-in state in which the first housing 210 is moved in the second direction relative to the second housing 220. The antenna member 330 may be located in the first opening 421 or the second opening 422 formed in the rear bracket 420 depending on whether the electronic device 200 is in the slide-in state or the slide-out state. Therefore, as the first opening 421 and the second opening 422 are formed, the deterioration of the antenna radiation performance of the antenna member 330 caused by the rear bracket 420 may be alleviated or resolved.

In an embodiment of the disclosure, although not illustrated in the drawing, the rear bracket 420 may include a third opening 423. The third opening 423 may be formed in an area of the rear bracket 420 corresponding to the movement path of the connection member 310 and the antenna member 330 that move in response to the sliding of the second housing 220 relative to the first housing 210. In this case, the antenna member 330 may face the third opening 423 formed in the rear bracket 420 in the middle area between the area where the electronic device 200 is in the slide-in or slide-out state and the area where the electronic device 200 is slid. Therefore, as the third opening 423 is formed in the rear bracket 420, the deterioration of the antenna radiation performance of the antenna member 330 caused by the rear bracket 420 may be alleviated or resolved.

According to various embodiments of the disclosure, as illustrated in FIGS. 10A, 10B, 11A, and 11B, the antenna member 330 may be disposed in the second area 310-2 (e.g., a straight area) of the connection member 310. In this case, since the antenna member 330 is disposed in the second area 310-2 that is relatively less bent than the first area 310-1 (e.g., a bending area), no bending stress may be applied to the connection member 310 while the electronic device 200 is being switched into the slide-in or slide-out state. In addition, since the antenna member 330 is less bent compared to the case where it is disposed in the first area 310-1 of the connection member 310 while the electronic device 200 is being switched into the slide-in or slide-out state. Thus, the antenna member 330 may not be damaged by bending stress.

Meanwhile, a separate space for disposing the antenna member 330 inside the electronic device 200 may not be formed. Accordingly, the antenna member 330 may be disposed in the second area 310-2 of the connection member 310 located inside the electronic device 200 without a separate arrangement space inside the electronic device 200, and may perform communication with an external electronic device.

According to various embodiments disclosed herein, an electronic device 200 (e.g., the electronic device 101 in FIG. 1) includes a first housing 210, a second housing 220 slidably coupled to the first housing, a first printed circuit board 301 (e.g., the first board 251 in FIG. 4) disposed in the first housing and having a communication module (e.g., the communication module 192 in FIG. 1) disposed thereon, a second printed circuit board 302 (e.g., the second board 252 in FIG. 4) disposed in the second housing, a connection member 310 made of a flexible material to electrically connect the first printed circuit board and the second printed circuit board, a support structure 320 fixed to the connection member and made of a non-conductive material, and an antenna member 330 (e.g., the antenna module 197 in FIG. 1) made of a conductive material and surrounding at least a portion of the support structure to be electrically connected to the connection member, the antenna member being configured to transmit or receive an RF signal.

The connection member may include a first area 310-1 configured to be bent in response to the sliding of the second housing relative to the first housing, and the support structure may be fixed to the first area of the connection member.

The second housing may include a guide groove 410 configured to guide the movement of the support structure, and the support structure may be configured to move along the guide groove in response to the sliding of the second housing relative to the first housing.

The second housing may include a partition wall 411 configured to surround the antenna member based on the sliding state of the second housing relative to the first housing, and at least a portion of the partition wall may be made of a non-conductive material.

The support structure may have a circular cross-section.

In addition, the electronic device may further include a rear bracket 420 (e.g., the rear bracket 214 in FIG. 4) disposed in at least one of the first housing and the second housing to cover the connection member and having a first opening 421 and a second opening 422 spaced apart from the first opening. The first opening may be disposed at a position corresponding to the position of the antenna member in a first state (e.g., the slide-out state of the electronic device 200) in which the first housing is moved in a first direction (e.g., the first direction based on FIG. 3B) relative to the second housing. The second opening may be disposed at a position corresponding to the position of the antenna member in a second state (e.g., the slide-in state of the electronic device 200) in which the first housing is moved in a second direction (e.g., the second direction based on FIG. 2A) opposite to the first direction relative to the second housing.

The electronic device may further include a rear bracket 420 disposed in at least one of the first housing and the second housing to cover the connection member. The rear bracket may include an opening (e.g., the third opening 423 in FIG. 9C) disposed to correspond to the guide groove of the second housing.

The connection member may include a first connection member 311, and a second connection member 312 on which the support structure and the antenna member are disposed.

The first connection member and the second connection member may be configured to allow different electrical signals pass therethrough.

The antenna member may be integrated with the connection member.

The support structure may be made of an elastic material.

An electronic device 200 (e.g., the electronic device 101 in FIG. 1) according to various embodiments disclosed herein may include a first housing 210, a second housing 220 slidably coupled to the first housing, a first printed circuit board 301 (e.g., the first board 251 in FIG. 4) disposed in the first housing and having a communication module (e.g., the communication module 192 in FIG. 1) disposed thereon, a second printed circuit board 302 (e.g., the second board 252 in FIG. 4) disposed in the second housing, a connection member 310 made of a flexible material to electrically connect the first printed circuit board and the second printed circuit board, and an antenna member 330 (e.g., the antenna module 197 in FIG. 1) made of a conductive material and electrically connected to the connection member, the antenna member being configured to transmit or receive an RF signal.

The connection member may include a first area 310-1 configured to bend in response to the sliding of the second housing relative to the first housing, and a second area 310-2 excluding the first area, and the antenna member may be disposed in the second area.

The second housing may include a partition wall 411 configured to surround the antenna member based on the sliding state of the second housing relative to the first housing, and at least a portion of the partition wall may be made of a non-conductive material.

In addition, the connection member may include a first connection member 311 and a second connection member 312 where the antenna member is disposed.

The first connection member and the second connection member may be configured to allow different electrical signals pass therethrough.

In addition, the electronic device may further include a rear bracket 420 (e.g., the rear bracket 214 in FIG. 4) disposed in at least one of the first housing and the second housing to cover the connection member and having a first opening 421 and a second opening 422 spaced apart from the first opening. The first opening may be disposed at a position corresponding to the position of the antenna member in a first state (e.g., the slide-out state of the electronic device 200) in which the first housing is moved in a first direction (e.g., the first direction based on FIG. 3B) relative to the second housing. The second opening may be disposed at a position corresponding to the position of the antenna member in a second state (e.g., the slide-in state of the electronic device 200) in which the first housing is moved in a second direction (e.g., the second direction based on FIG. 2A) opposite to the first direction relative to the second housing.

The electronic device may further include a rear bracket 420 disposed in at least one of the first housing and the second housing to cover the connection member. The rear bracket may include an opening (e.g., the third opening 423 in FIG. 9C) disposed in an area corresponding to a path along which the antenna member moves in response to the sliding of the second housing relative to the first housing.

The antenna member may be integrated with the connection member.

The connection member may include a groove (not illustrated) in the second area, and the antenna member may be disposed in the groove in the second area.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing slidably coupled to the first housing;

a first printed circuit board disposed in the first housing and having a communication module disposed thereon;

a second printed circuit board disposed in the second housing;

a connection member made of a flexible material to electrically connect the first printed circuit board and the second printed circuit board;

a support structure fixed to the connection member and made of a non-conductive material; and an antenna member surrounding at least a portion of the support structure and made of a conductive material to be electrically connected to the connection member, the antenna member being configured to transmit or receive a radio frequency (RF) signal, wherein the connection member comprises an area configured to be bent in response to a sliding of the second housing relative to the first housing, and wherein the support structure is fixed to the area of the connection member.

2. The electronic device of claim 1, wherein the second housing comprises a guide groove configured to guide movement of the support structure, and wherein the support structure is configured to move along the guide groove in response to the sliding of the second housing relative to the first housing.

3. The electronic device of claim 2, further comprising:

a rear bracket disposed in at least one of the first housing and the second housing to cover the connection member, wherein the rear bracket comprises an opening disposed to correspond with the guide groove in the second housing.

4. The electronic device of claim 1, wherein the second housing comprises a partition wall configured to surround the antenna member based on a sliding state of the second housing relative to the first housing, and wherein at least a portion of the partition wall is made of a non-conductive material.

5. The electronic device of claim 1, wherein the support structure has a circular cross-section.

6. The electronic device of claim 1, further comprising:

a rear bracket disposed in at least one of the first housing and the second housing to cover the connection member, and comprising a first opening and a second opening spaced apart from the first opening, wherein the first opening is disposed at a position corresponding to a position of the antenna member in a first state in which the first housing is moved in a first direction relative to the second housing, and wherein the second opening is disposed at a position corresponding to a position of the antenna member in a second state in which the first housing is moved in a second direction opposite to the first direction relative to the second housing.

7. The electronic device of claim 1, wherein the connection member comprises a first connection member, and a second connection member on which the support structure and the antenna member are disposed.

8. The electronic device of claim 7, wherein the first connection member and the second connection member are configured to allow different electrical signals to pass therethrough.

9. The electronic device of claim 1, wherein the antenna member is integrated with the connection member.

10. The electronic device of claim 1, wherein the support structure is formed of an elastic material.

11. An electronic device comprising:

a first housing;

a second housing slidably coupled to the first housing;

a first printed circuit board disposed in the first housing and having a communication module disposed thereon;

a second printed circuit board disposed in the second housing;

a connection member made of a flexible material to electrically connect the first printed circuit board and the second printed circuit board; and an antenna member made of a conductive material to be electrically connected to the connection member and configured to transmit or receive a radio frequency (RF) signal, wherein the connection member comprises a first area configured to be bent in response to a sliding of the second housing relative to the first housing, and a second area excluding the first area, and wherein the antenna member is disposed in the second area.

12. The electronic device of claim 11, wherein the second housing comprises a partition wall configured to surround the antenna member based on a sliding state of the second housing relative to the first housing, and wherein at least a portion of the partition wall is made of a non-conductive material.

13. The electronic device of claim 11, wherein the connection member comprises a first connection member, and a second connection member on which a support structure and the antenna member are disposed.

14. The electronic device of claim 13, wherein the first connection member and the second connection member are configured to allow different electrical signals to pass therethrough.

15. The electronic device of claim 11, further comprising:

a rear bracket disposed in at least one of the first housing and the second housing to cover the connection member, and comprising a first opening and a second opening located spaced apart from the first opening, wherein the first opening is disposed at a position corresponding to a position of the antenna member in a first state in which the first housing is moved in a first direction relative to the second housing, and wherein the second opening is disposed at a position corresponding to a position of the antenna member in a second state in which the first housing is moved in a second direction opposite to the first direction relative to the second housing.

16. The electronic device of claim 11, further comprising:

a rear bracket disposed in at least one of the first housing and the second housing to cover the connection member, wherein the rear bracket comprises an opening disposed in an area corresponding to a path along which the antenna member moves in response to the sliding of the second housing relative to the first housing.

17. The electronic device of claim 11, wherein the antenna member is integrated with the connection member.

18. The electronic device of claim 11, wherein the connection member includes a groove formed in the second area, and wherein the antenna member is disposed in the groove formed in the second area.

* * * * *